United States Patent
Liu et al.

(10) Patent No.: US 12,170,572 B2
(45) Date of Patent: Dec. 17, 2024

(54) SIGNALING FOR NETWORK CODED SIDELINK RETRANSMISSIONS

(71) Applicant: QUALCOMM Incorporated, San Diego, CA (US)

(72) Inventors: Guangyi Liu, San Diego, CA (US); Gabi Sarkis, San Diego, CA (US); Shuanshuan Wu, San Diego, CA (US); Kapil Gulati, Belle Mead, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 446 days.

(21) Appl. No.: 17/643,648

(22) Filed: Dec. 10, 2021

(65) Prior Publication Data

US 2023/0188259 A1     Jun. 15, 2023

(51) Int. Cl.
*H04L 1/08* (2006.01)
*H04L 1/1829* (2023.01)
*H04W 92/18* (2009.01)

(52) U.S. Cl.
CPC .............. *H04L 1/08* (2013.01); *H04L 1/1835* (2013.01); *H04L 1/1854* (2013.01); *H04W 92/18* (2013.01)

(58) Field of Classification Search
CPC ....... H04L 1/08; H04L 1/1835; H04L 1/1854; H04L 1/188; H04L 1/0028; H04W 92/18; H04W 28/04
See application file for complete search history.

(56) References Cited

U.S. PATENT DOCUMENTS

| | | | | |
|---|---|---|---|---|
| 2020/0153538 A1* | 5/2020 | Chen | ...................... | H04L 1/0028 |
| 2020/0220694 A1* | 7/2020 | Khoryaev | ............. | H04W 28/04 |
| 2020/0228247 A1* | 7/2020 | Guo | ........................ | H04L 5/0048 |
| 2022/0150730 A1* | 5/2022 | Freda | .................... | H04W 24/04 |
| 2022/0150872 A1* | 5/2022 | Park | ....................... | H04W 92/18 |
| 2022/0322296 A1* | 10/2022 | Yu | .......................... | H04L 1/1861 |

FOREIGN PATENT DOCUMENTS

TW         I753283 B  *  1/2022

* cited by examiner

*Primary Examiner* — Ayaz R Sheikh
*Assistant Examiner* — Louis Samara
(74) *Attorney, Agent, or Firm* — Kevin M. Donnelly; Harrity & Harrity, LLP

(57) ABSTRACT

Various aspects of the present disclosure generally relate to wireless communication. In some aspects, an encoder device may receive, from a base station, in accordance with a buffer configuration of the encoder device or a buffer report associated with the encoder device, an indication of a set of transport blocks (TBs) for a network coded sidelink retransmission, the set of TBs associated with one or more sidelink transmissions. The encoder device may transmit the network coded sidelink retransmission based at least in part on encoding TBs, included in the set of TBs, that are stored in a buffer of the encoder device. Numerous other aspects are provided.

24 Claims, 12 Drawing Sheets

SIGNALING FOR NETWORK CODED SIDELINK RETRANSMISSIONS

FIELD OF THE DISCLOSURE

Aspects of the present disclosure generally relate to wireless communication and specifically, to techniques and apparatuses for signaling for network coded sidelink retransmissions.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (for example, bandwidth or transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

The above multiple access technologies have been adopted in various telecommunication standards to provide a common protocol that enables different UEs to communicate on a municipal, national, regional, or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

Network coding and recovery may enable a user equipment (UE) to recover a communication that has been erased (for example, lost or corrupted) during transmission. The recovery of the erased communication, without requiring retransmission by the network node, may reduce the overall quantity of retransmissions by the network node and may reduce the overall load on the network. In some cases, a base station may determine packets or transport blocks (TBs) that are to be included in a network coded retransmission for sidelink communication. For example, in a Mode 1 transmission mode, where sidelink resource selection or scheduling is performed by a base station, the base station may coordinate UEs, roadside units (RSUs), and encoding devices in a sidelink network. In such examples, the base station may determine data, such as packets or TBs, that are to be retransmitted. For example, the base station may receive feedback from one or more UEs indicating sidelink communications associated with an erasure or a failed transmission. In some cases, another device (such as an encoder device), rather than the base station, may transmit a network coded sidelink retransmission that combines data from the sidelink communications associated with an erasure or a failed transmission.

However, the encoder device may be unaware of the packets or TBs to include in the network coded sidelink retransmission because UEs in the sidelink network may be operating in the Mode 1 transmission mode (for example, where feedback is provided to the base station and not the encoder device or other UEs). This may result in the encoder device transmitting a network coded sidelink retransmission that does not include data associated with a sidelink transmission that previously failed, thereby resulting in that data being retransmitted in a subsequent sidelink transmission or network coded retransmission. Additionally, the base station may be unaware of data that is stored (for example, in a buffer) by the encoder device. As a result, the base station may request that an encoder device include data (for example, a packet or a TB) in a network coded sidelink retransmission when the encoder device does not have access to the data. This may result in an encoding failure or may result in the data not being included in the network coded sidelink retransmission.

SUMMARY

Some aspects described herein relate to an encoder device for wireless communication. The encoder device may include at least one processor and at least one memory, communicatively coupled with the at least one processor, that stores processor-readable code. The processor-readable code, when executed by the at least one processor, may be configured to cause the encoder device to receive, from a base station, in accordance with a buffer configuration of the encoder device or a buffer report associated with the encoder device, an indication of a set of transport blocks (TBs) for a network coded sidelink retransmission, the set of TBs associated with one or more sidelink transmissions. The processor-readable code, when executed by the at least one processor, may be configured to cause the encoder device to transmit the network coded sidelink retransmission based at least in part on encoding TBs, included in the set of TBs, that are stored in a buffer of the encoder device.

Some aspects described herein relate to a base station for wireless communication. The base station may include at least one processor and at least one memory, communicatively coupled with the at least one processor, that stores processor-readable code. The processor-readable code, when executed by the at least one processor, may be configured to cause the base station to communicate, with an encoder device, a buffer configuration of the encoder device or a buffer report associated with the encoder device. The processor-readable code, when executed by the at least one processor, may be configured to cause the base station to transmit, to the encoder device, an indication of a set of TBs, in accordance with the buffer configuration or the buffer report, associated with one or more sidelink transmissions, to be encoded by the encoder device.

Some aspects described herein relate to a method of wireless communication performed by an encoder device. The method may include receiving, from a base station, in accordance with a buffer configuration of the encoder device or a buffer report associated with the encoder device, an indication of a set of TBs for a network coded sidelink retransmission, the set of TBs associated with one or more sidelink transmissions. The method may include transmitting the network coded sidelink retransmission based at least in part on encoding TBs, included in the set of TBs, that are stored in a buffer of the encoder device.

Some aspects described herein relate to a method of wireless communication performed by a base station. The method may include communicating, with an encoder device, a buffer configuration of the encoder device or a buffer report associated with the encoder device. The method may include transmitting, to the encoder device, an indication of a set of TBs, in accordance with the buffer configuration or the buffer report, associated with one or more sidelink transmissions, to be encoded by the encoder device.

Some aspects described herein relate to a non-transitory computer-readable medium that stores a set of instructions for wireless communication by an encoder device. The set of instructions, when executed by one or more processors of the encoder device, may cause the encoder device to receive, from a base station, in accordance with a buffer configuration of the encoder device or a buffer report associated with the encoder device, an indication of a set of TBs for a network coded sidelink retransmission, the set of TBs associated with one or more sidelink transmissions. The set of instructions, when executed by one or more processors of the encoder device, may cause the encoder device to transmit the network coded sidelink retransmission based at least in part on encoding TBs, included in the set of TBs, that are stored in a buffer of the encoder device.

Some aspects described herein relate to a non-transitory computer-readable medium that stores a set of instructions for wireless communication by a base station. The set of instructions, when executed by one or more processors of the base station, may cause the base station to communicate, with an encoder device, a buffer configuration of the encoder device or a buffer report associated with the encoder device. The set of instructions, when executed by one or more processors of the base station, may cause the base station to transmit, to the encoder device, an indication of a set of TBs, in accordance with the buffer configuration or the buffer report, associated with one or more sidelink transmissions, to be encoded by the encoder device.

Some aspects described herein relate to an apparatus for wireless communication. The apparatus may include means for receiving, from a base station, in accordance with a buffer configuration of the apparatus or a buffer report associated with the apparatus, an indication of a set of TBs for a network coded sidelink retransmission, the set of TBs associated with one or more sidelink transmissions. The apparatus may include means for transmitting the network coded sidelink retransmission based at least in part on encoding TBs, included in the set of TBs, that are stored in a buffer of the apparatus.

Some aspects described herein relate to an apparatus for wireless communication. The apparatus may include means for communicating, with an encoder device, a buffer configuration of the encoder device or a buffer report associated with the encoder device. The apparatus may include means for transmitting, to the encoder device, an indication of a set of TBs, in accordance with the buffer configuration or the buffer report, associated with one or more sidelink transmissions, to be encoded by the encoder device.

Aspects generally include a method, apparatus, system, computer program product, non-transitory computer-readable medium, user equipment, base station, wireless communication device, or processing system as substantially described with reference to and as illustrated by the drawings and specification.

The foregoing has outlined rather broadly the features and technical advantages of examples in accordance with the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only some typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
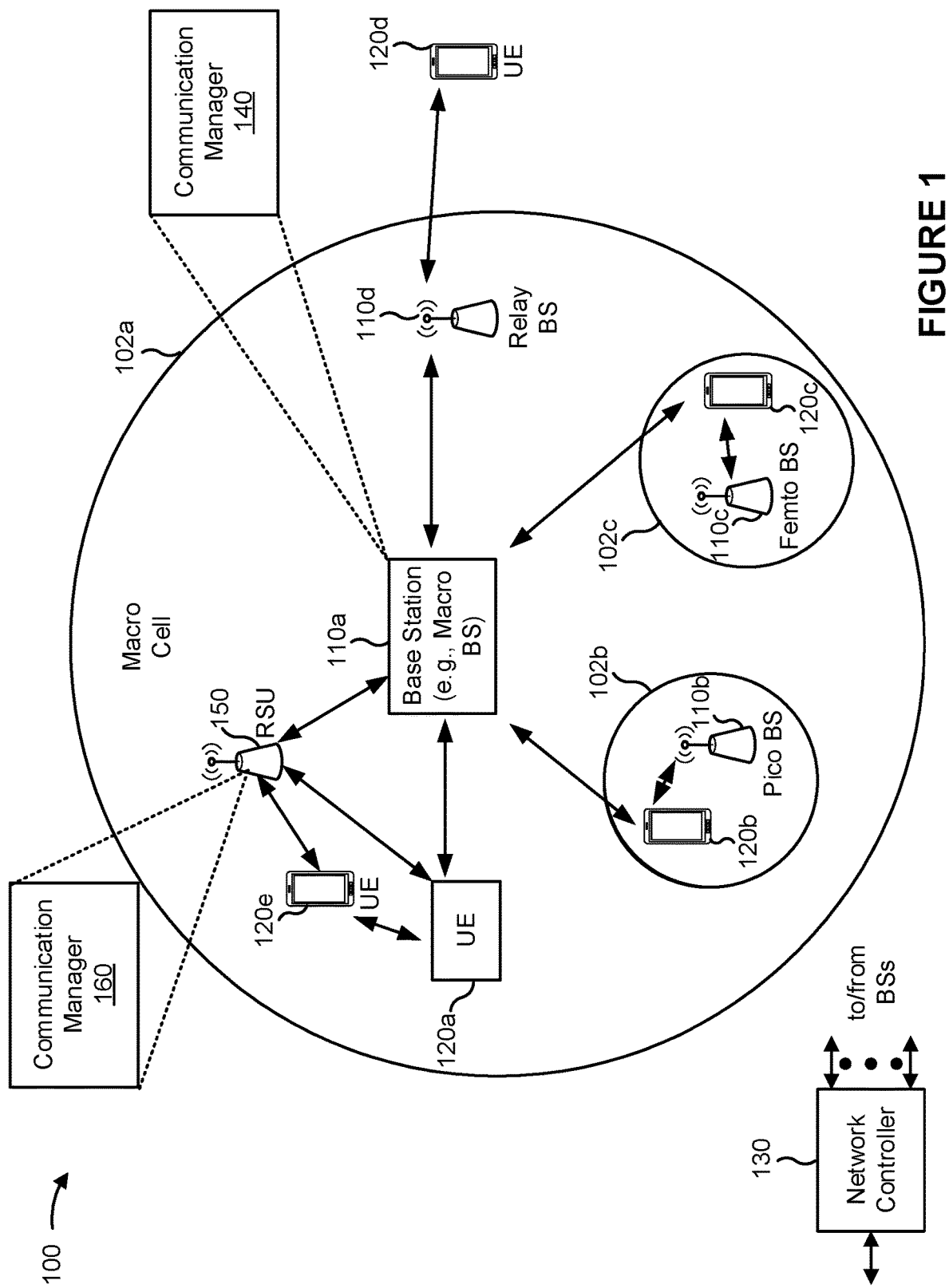
FIG. 1 is a diagram illustrating an example of a wireless network in accordance with the present disclosure.

Various aspects of the disclosure are described more fully hereinafter with reference to the accompanying drawings.

This disclosure may, however, be embodied in many different forms and are not to be construed as limited to any specific structure or function presented throughout this disclosure. Rather, these aspects are provided so that this disclosure will be thorough and complete, and will fully convey the scope of the disclosure to those skilled in the art. One skilled in the art may appreciate that the scope of the disclosure is intended to cover any aspect of the disclosure disclosed herein, whether implemented independently of or combined with any other aspect of the disclosure. For example, an apparatus may be implemented or a method may be practiced using any quantity of the aspects set forth herein. In addition, the scope of the disclosure is intended to cover such an apparatus or method which is practiced using other structure, functionality, or structure and functionality in addition to or other than the various aspects of the disclosure set forth herein. Any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, or algorithms (collectively referred to as "elements"). These elements may be implemented using hardware, software, or a combination of hardware and software. Whether such elements are implemented as hardware or software depends upon the particular application and design constraints imposed on the overall system.

Various aspects relate generally to signaling for network coded sidelink retransmissions. Some aspects more specifically relate to a base station transmitting, to an encoder device (for example, a roadside unit (RSU), a user equipment (UE), or another device) an indication of a set of transport blocks (TBs) (or packets) for a network coded sidelink retransmission where the set of TBs are associated with one or more sidelink transmissions. The base station may transmit the set of TBs in accordance with a buffer configuration of the encoder device or a buffer report associated with the encoder device. For example, in some aspects, the base station may transmit, and the encoder device may receive, the buffer configuration, which may indicate a type of TB that is to be stored (for example, buffered) by the encoder device. Additionally or alternatively, the encoder device may transmit, and the base station may receive, the buffer status report, which may indicate TBs that are currently stored (for example, in a buffer) by the encoder device. Therefore, the base station may ensure (or increase a likelihood) that the set of TBs indicated by the base station (for example, to be included in the network coded sidelink retransmission) are stored by the encoder device. The encoder device may transmit the network coded sidelink retransmission. For example, the encoder device may encode TBs, included in the set of TBs, that are stored in a buffer of the encoder device to generate the network coded sidelink retransmission.

In some aspects, the base station may allocate physical uplink control channel (PUCCH) resources for the encoder device to provide feedback, to the base station, associated with the network coded sidelink retransmission. For example, the encoder device may use the PUCCH resources to transmit an indication of whether the indicated set of TBs are stored by the encoder device. As another example, the encoder device may use the PUCCH resources to transmit an indication of whether the network coded sidelink retransmission is successfully decoded by one or more receivers (for example, by one or more UEs).

In some aspects, an action to be performed based at least in part on one or more TBs, from the indicated set of TBs, not being included in the buffer of the encoder device is configured by the base station or defined (for example, by a wireless communication standard). The action performed by the encoder device may include refraining from transmitting the network coded sidelink retransmission or, alternatively, transmitting the network coded sidelink retransmission without including the one or more TBs in the network coded sidelink retransmission.

In some aspects, buffers of the base station and one or more encoder devices may be synchronized. For example, when UE feedback (for example, an acknowledgement (ACK) message) is transmitted to the base station, the base station may transmit, to the one or more encoder devices, an indication to remove the TBs or packets that have been successfully decoded by one or more UEs (for example, TBs or packets that are associated with an ACK message). When UE feedback is transmitted to the one or more encoder devices, an encoder device may transmit, to the base station, an indication to remove the TBs or packets that have been successfully decoded by one or more UEs. In this way, the TBs or packets stored by the base station and the one or more encoder devices may be synchronized.

Particular aspects of the subject matter described in this disclosure can be implemented to realize one or more of the following potential advantages. In some examples, the described techniques can be used to enable network coded sidelink retransmissions by an encoder device (for example, a device other than a base station) when a base station is managing sidelink scheduling or resource allocation (for example, in a Mode 1 transmission mode). Enabling network coded sidelink retransmissions in a sidelink network may reduce an overall quantity of retransmissions in the sidelink network, thereby conserving resources and reducing an overall load on the network. Additionally, enabling the encoder device to transmit the network coded sidelink retransmissions may expand a coverage area and may improve a reliability of the network coded sidelink retransmissions (for example, compared to a coverage area or reliability of the network coded sidelink retransmissions if the network coded sidelink retransmissions were only transmitted by the base station).

As another example, enabling the encoder device to transmit, to the base station, an indication of whether the indicated set of TBs are stored by the encoder device or an indication of whether the network coded sidelink retransmission is successfully decoded by one or more receivers may improve resource allocation or scheduling determinations made by the base station. For example, the base station may be enabled to transmit TBs, that were not stored by the encoder device, to the encoder device to enable the encoder device to generate or transmit the network coded sidelink retransmission. Additionally, the encoder device performing one or more actions based at least in part on one or more TBs, from the indicated set of TBs, not being included in the buffer of the encoder device may improve an efficiency and reliability of the network coded sidelink retransmissions (for example, because all devices in the sidelink network may be synchronized as to what action(s) the encoder device will perform when one or more TBs, from the indicated set of TBs, are not included in the buffer of the encoder device).

FIG. 1 is a diagram illustrating an example of a wireless network in accordance with the present disclosure. The wireless network 100 may be or may include elements of a 5G (for example, NR) network or a 4G (for example, Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), or other network entities. A base station 110 is an entity that communicates with UEs 120. A base station 110 (sometimes referred to as a BS) may include, for example, an NR base station, an LTE base station, a Node B, an eNB (for example, in 4G), a gNB (for example, in 5G), an access point, or a transmission reception point (TRP). Each base station 110 may provide communication coverage for a particular geographic area. In the Third Generation Partnership Project (3GPP), the term "cell" can refer to a coverage area of a base station 110 or a base station subsystem serving this coverage area, depending on the context in which the term is used.

A base station 110 may provide communication coverage for a macro cell, a pico cell, a femto cell, or another type of cell. A macro cell may cover a relatively large geographic area (for example, several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (for example, a home) and may allow restricted access by UEs 120 having association with the femto cell (for example, UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station.

The wireless network 100 may be a heterogeneous network that includes base stations 110 of different types, such as macro base stations, pico base stations, femto base stations, or relay base stations. These different types of base stations 110 may have different transmit power levels, different coverage areas, or different impacts on interference in the wireless network 100. For example, macro base stations may have a high transmit power level (for example, 5 to 40 watts) whereas pico base stations, femto base stations, and relay base stations may have lower transmit power levels (for example, 0.1 to 2 watts). In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (for example, three) cells. A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

In some examples, a cell may not necessarily be stationary, and the geographic area of the cell may move in accordance with the location of a base station 110 that is mobile (for example, a mobile base station). In some examples, the base stations 110 may be interconnected to one another or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (for example, a base station 110 or a UE 120) and send a transmission of the data to a downstream station (for example, a UE 120 or a base station 110). A relay station may be a UE 120 that can relay transmissions for other UEs 120. In the example shown in FIG. 1, the BS 110d (for example, a relay base station) may communicate with the BS 110a (for example, a macro base station) and the UE 120d in order to facilitate communication between the BS 110a and the UE 120d. A base station 110 that relays communications may be referred to as a relay station, a relay base station, or a relay.

The UEs 120 may be dispersed throughout the wireless network 100, and each UE 120 may be stationary or mobile. A UE 120 may include, for example, an access terminal, a terminal, a mobile station, or a subscriber unit. A UE 120 may be a cellular phone (for example, a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (for example, a smart watch, smart clothing, smart glasses, a smart wristband, smart jewelry (for example, a smart ring or a smart bracelet)), an entertainment device (for example, a music device, a video device, or a satellite radio), a vehicular component or sensor, a smart meter/sensor, industrial manufacturing equipment, a global positioning system device, or any other suitable device that is configured to communicate via a wireless medium.

Some UEs 120 may be considered machine-type communication (MTC) or evolved or enhanced machine-type communication (eMTC) UEs. An MTC UE or an eMTC UE may include, for example, a robot, a drone, a remote device, a sensor, a meter, a monitor, or a location tag, that may communicate with a base station, another device (for example, a remote device), or some other entity. Some UEs 120 may be considered Internet-of-Things (IoT) devices, or may be implemented as NB-IoT (narrowband IoT) devices. Some UEs 120 may be considered a Customer Premises Equipment. A UE 120 may be included inside a housing that houses components of the UE 120, such as processor components or memory components. In some examples, the processor components and the memory components may be coupled together. For example, the processor components (for example, one or more processors) and the memory components (for example, a memory) may be operatively coupled, communicatively coupled, electronically coupled, or electrically coupled.

In general, any quantity of wireless networks 100 may be deployed in a given geographic area. Each wireless network 100 may support a particular RAT and may operate on one or more frequencies. A RAT may be referred to as a radio technology or an air interface. A frequency may be referred to as a carrier or a frequency channel. Each frequency may support a single RAT in a given geographic area in order to avoid interference between wireless networks of different RATs. In some cases, NR or 5G RAT networks may be deployed.

In some examples, two or more UEs 120 (for example, shown as UE 120a and UE 120e) may communicate directly using one or more sidelink channels (for example, without using a base station 110 as an intermediary to communicate with one another). For example, the UEs 120 may communicate using peer-to-peer (P2P) communications, device-todevice (D2D) communications, a vehicle-to-everything (V2X) protocol (for example, which may include a vehicle-to-vehicle (V2V) protocol, a vehicle-to-infrastructure (V2I) protocol, or a vehicle-to-pedestrian (V2P) protocol), or a mesh network. In such examples, a UE 120 may perform scheduling operations, resource selection operations, or other operations described elsewhere herein as being performed by the base station 110.

In some examples, an RSU 150 may communicate with a base station 110 (for example, using an uplink or a downlink). The RSU 150 may communicate with one or more UEs 120 directly using one or more sidelink channels (for example, without using a base station 110 as an intermediary to communicate with one another). In some examples, the RSU 150 may be physically mounted along a road or pedestrian passageway. In other words, the RSU 150 may be stationary. For example, the RSU 150 may be a dedicated short range communications (DSRC) transceiver that is mounted along a road or pedestrian passageway. In some examples, the RSU 150 may be a UE 120. The RSU 150 may be an example of an encoder device that is described in more detail elsewhere herein.

Devices of the wireless network 100 may communicate using the electromagnetic spectrum, which may be subdivided by frequency or wavelength into various classes, bands, or channels. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs in connection with FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics or FR2 characteristics, and thus may effectively extend features of FR1 or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz," if used herein, may broadly represent frequencies that may be less than 6 GHz, may be within FR1, or may include mid-band frequencies. Further, unless specifically stated otherwise, it should be understood that the term "millimeter wave," if used herein, may broadly represent frequencies that may include mid-band frequencies, may be within FR2, FR4, FR4-a or FR4-1, or FR5, or may be within the EHF band. It is contemplated that the frequencies included in these operating bands (for example, FR1, FR2, FR3, FR4, FR4-a, FR4-1, or FR5) may be modified, and techniques described herein are applicable to those modified frequency ranges.

In some aspects, the base station 110 may include a communication manager 140. As described in more detail elsewhere herein, the communication manager 140 may communicate, with an encoder device (for example, the RSU 150), a buffer configuration of the encoder device or a buffer report associated with the encoder device; and transmit, to the encoder device, an indication of a set of TBs, in accordance with the buffer configuration or the buffer report, associated with one or more sidelink transmissions, to be encoded by the encoder device. Additionally or alternatively, the communication manager 140 may perform one or more other operations described herein.

In some aspects, the RSU 150 may include a communication manager 160. As described in more detail elsewhere herein, the communication manager 160 may receive, from a base station 110, in accordance with a buffer configuration of the RSU 150 or a buffer report associated with the RSU 150, an indication of a set of TBs for a network coded sidelink retransmission, the set of TBs associated with one or more sidelink transmissions; and transmit the network coded sidelink retransmission based at least in part on encoding TBs, included in the set of TBs, that are stored in a buffer of the encoder device. Additionally or alternatively, the communication manager 160 may perform one or more other operations described herein.

Figure 2:
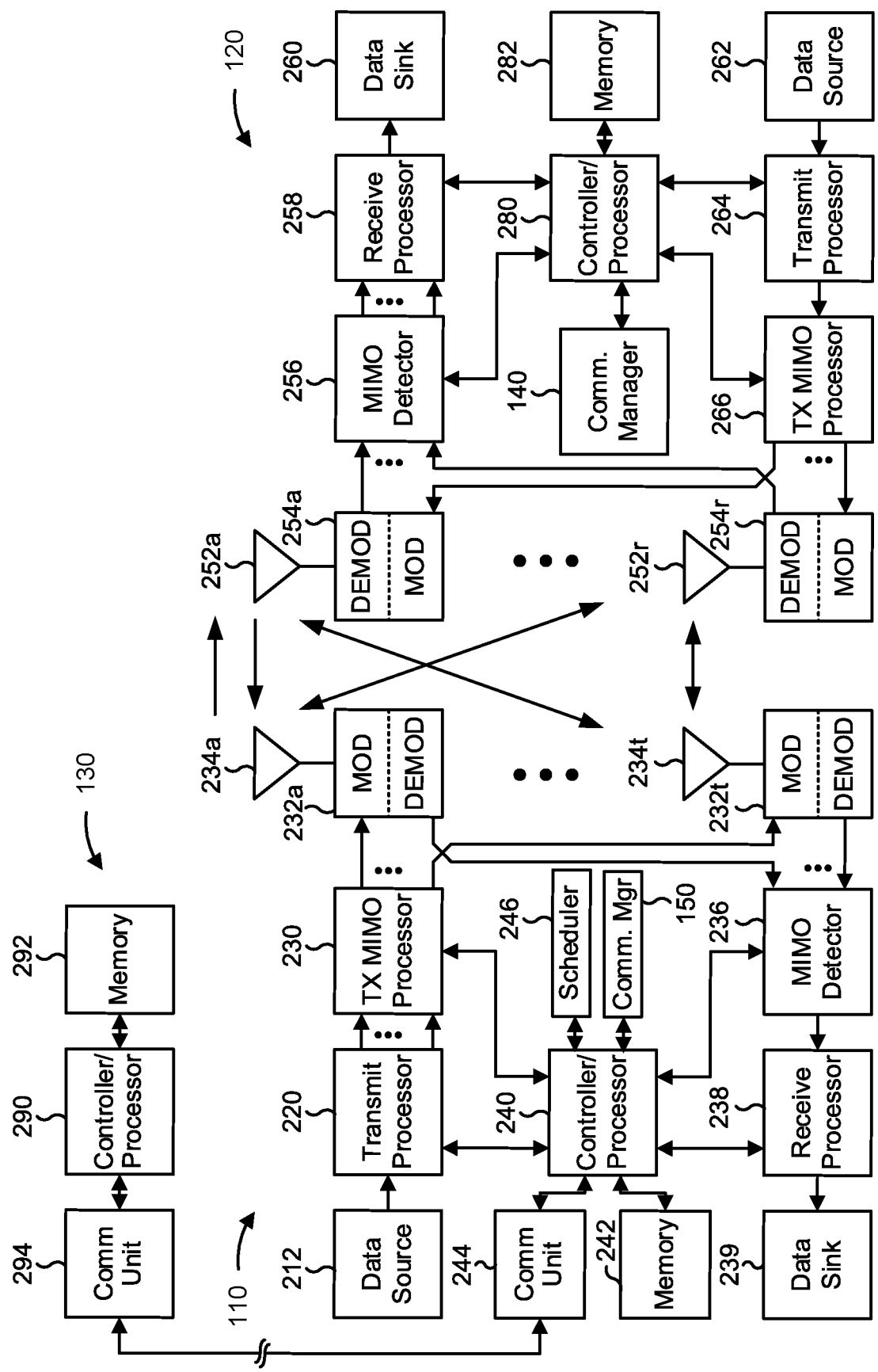
FIG. 2 is a diagram illustrating an example base station in communication with a user equipment (UE) in a wireless network in accordance with the present disclosure.

FIG. 2 is a diagram illustrating an example base station in communication with a UE in a wireless network in accordance with the present disclosure. The base station may correspond to the base station 110 of FIG. 1. Similarly, the UE may correspond to the UE 120 of FIG. 1. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (for example, encode and modulate) the data for the UE 120 based at least in part on the MCS(s) selected for the UE 120 and may provide data symbols for the UE 120. The transmit processor 220 may process system information (for example, for semi-static resource partitioning information (SRPI)) and control information (for example, CQI requests, grants, or upper layer signaling) and provide overhead symbols and control symbols. The transmit processor 220 may generate reference symbols for reference signals (for example, a cell-specific reference signal (CRS) or a demodulation reference signal (DMRS)) and synchronization signals (for example, a primary synchronization signal (PSS) or a secondary synchronization signal (SSS)). A transmit (TX) multiple-input multiple-output (MIMO) processor 230 may perform spatial processing (for example, precoding) on the data symbols, the control symbols, the overhead symbols, or the reference symbols, if applicable, and may provide a set of output symbol streams (for example, T output symbol streams) to a corresponding set of modems 232 (for example, T modems), shown as modems 232a through 232t. For example, each output symbol stream may be provided to a modulator component (shown as MOD) of a modem 232. Each modem 232 may use a respective modulator component to process a respective output symbol stream (for example, for OFDM) to obtain an output sample stream. Each modem 232 may further use a respective modulator component to process (for example, convert to analog, amplify, filter, or upconvert) the output sample stream to obtain a downlink signal. The modems 232a through 232t may transmit a set of downlink signals (for example, T downlink signals) via a corresponding set of antennas 234 (for example, T antennas), shown as antennas 234a through 234t.

At the UE 120, a set of antennas 252 (shown as antennas 252a through 252r) may receive the downlink signals from the base station 110 or other base stations 110 and may provide a set of received signals (for example, R received signals) to a set of modems 254 (for example, R modems), shown as modems 254a through 254r. For example, each received signal may be provided to a demodulator component (shown as DEMOD) of a modem 254. Each modem 254 may use a respective demodulator component to condition (for example, filter, amplify, downconvert, or digitize) a received signal to obtain input samples. Each modem 254 may use a demodulator component to further process the input samples (for example, for OFDM) to obtain received symbols. A MIMO detector 256 may obtain received symbols from the modems 254, may perform MIMO detection on the received symbols if applicable, and may provide detected symbols. A receive processor 258 may process (for example, demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, or a CQI parameter, among other examples. In some examples, one or more components of the UE 120 may be included in a housing.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (for example, antennas 234a through 234t or antennas 252a through 252r) may include, or may be included within, one or more antenna panels, one or more antenna groups, one or more sets of antenna elements, or one or more antenna arrays, among other examples. An antenna panel, an antenna group, a set of antenna elements, or an antenna array may include one or more antenna elements (within a single housing or multiple housings), a set of coplanar antenna elements, a set of non-coplanar antenna elements, or one or more antenna elements coupled to one or more transmission or reception components, such as one or more components of FIG. 2.

On the uplink, at the UE 120, a transmit processor 264 may receive and process data from a data source 262 and control information (for example, for reports that include RSRP, RSSI, RSRQ, or CQI) from the controller/processor 280. The transmit processor 264 may generate reference symbols for one or more reference signals. The symbols from the transmit processor 264 may be precoded by a TX MIMO processor 266 if applicable, further processed by the modems 254 (for example, for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, or the TX MIMO processor 266. The transceiver may be used by a processor (for example, the controller/processor 280) and the memory 282 to perform aspects of any of the methods described herein.

At the base station 110, the uplink signals from UE 120 or other UEs may be received by the antennas 234, processed by the modem 232 (for example, a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, or the TX MIMO processor 230. The transceiver may be used by a processor (for example, the controller/processor 240) and the memory 242 to perform aspects of any of the methods described herein.

The controller/processor 240 of the base station 110, the controller/processor 280 of the UE 120, or any other component(s) of FIG. 2 may perform one or more techniques associated with signaling for network coded sidelink retransmissions, as described in more detail elsewhere herein. In some aspects, the encoder device described herein is the UE 120, is included in the UE 120, or includes one or more components of the UE 120 shown in FIG. 2. In some aspects, the encoder device described herein is the RSU 150, is included in the RSU 150, or includes one or more components of the RSU 150. For example, the controller/processor 240 of the base station 110, the controller/processor 280 of the UE 120, or any other component(s) of FIG. 2 may perform or direct operations of, for example, process 900 of FIG. 9, process 1000 of FIG. 10, or other processes as described herein. The memory 242 and the memory 282 may store data and program codes for the base station 110 and the UE 120, respectively. In some examples, the memory 242 or the memory 282 may include a non-transitory computer-readable medium storing one or more instructions (for example, code or program code) for wireless communication. For example, the one or more instructions, when executed (for example, directly, or after compiling, converting, or interpreting) by one or more processors of the base station 110 or the UE 120, may cause the one or more processors, the UE 120, or the base station 110 to perform or direct operations of, for example, process 900 of FIG. 9, process 1000 of FIG. 10, or other processes as described herein. In some examples, executing instructions may include running the instructions, converting the instructions, compiling the instructions, or interpreting the instructions, among other examples.

In some aspects, the encoder device includes means for receiving, from a base station, in accordance with a buffer configuration of the encoder device or a buffer report associated with the encoder device, an indication of a set of TBs for a network coded sidelink retransmission, the set of TBs associated with one or more sidelink transmissions; or means for transmitting the network coded sidelink retransmission based at least in part on encoding TBs, included in the set of TBs, that are stored in a buffer of the encoder device. In some aspects, the means for the encoder device to perform operations described herein may include, for example, one or more of communication manager 160, transmit processor 220, TX MIMO processor 230, modem 232, antenna 234, MIMO detector 236, receive processor 238, controller/processor 240, memory 242, or scheduler 246. In some other aspects, the means for the encoder device to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the base station includes means for communicating, with an encoder device, a buffer configuration of the encoder device or a buffer report associated with the encoder device; or means for transmitting, to the encoder device, an indication of a set of TBs, in accordance with the buffer configuration or the buffer report, associated with one or more sidelink transmissions, to be encoded by the encoder device. The means for the base station to perform operations described herein may include, for example, one or more of communication manager 140, transmit processor 220, TX MIMO processor 230, modem 232, antenna 234, MIMO detector 236, receive processor 238, controller/processor 240, memory 242, or scheduler 246.

Figure 3:
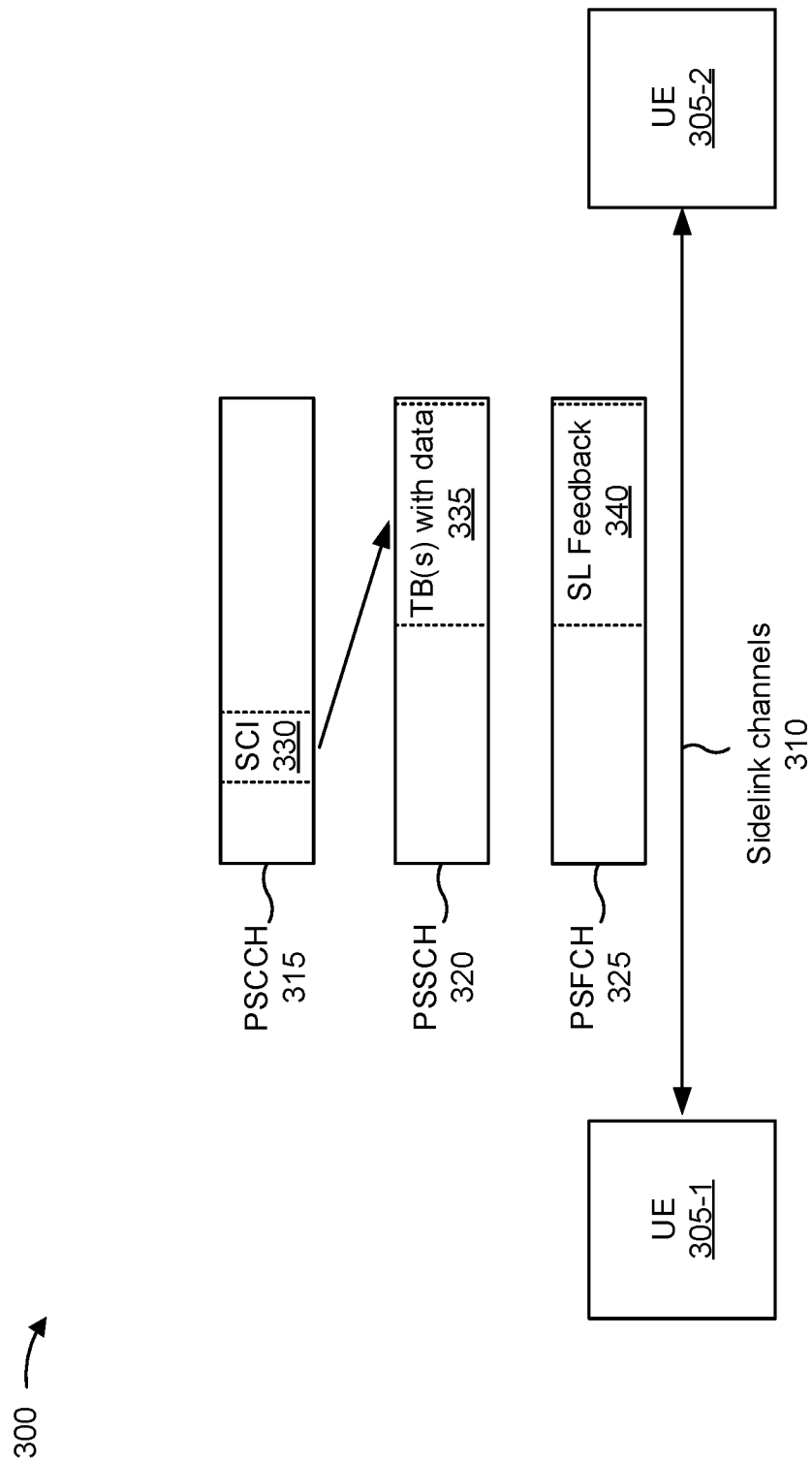
FIG. 3 is a diagram illustrating an example of sidelink communications, in accordance with the present disclosure.

FIG. 3 is a diagram illustrating an example of sidelink communications 300, in accordance with the present disclosure. As shown in FIG. 3, a first UE 305-1 may communicate with a second UE 305-2 (and one or more other UEs 305) via one or more sidelink channels 310. The UEs 305-1 and 305-2 may communicate using the one or more sidelink channels 310 for P2P communications, D2D communications, V2X communications (for example, which may include V2V communications, V2I communications, or V2P communications) or mesh networking. In some examples, the UEs 305 (for example, UE 305-1 or UE 305-2) may correspond to one or more other UEs described elsewhere herein, such as UE 120. In some examples, the one or more sidelink channels 310 may use a PC5 interface or may operate in a high frequency band (for example, the 5.9 GHz band). Additionally or alternatively, the UEs 305 may synchronize timing of transmission time intervals (TTIs) (for example, frames, subframes, slots, or symbols) using global navigation satellite system (GNSS) timing.

As further shown in FIG. 3, the one or more sidelink channels 310 may include a physical sidelink control channel (PSCCH) 315, a physical sidelink shared channel (PSSCH) 320, or a physical sidelink feedback channel (PSFCH) 325. The PSCCH 315 may be used to communicate control information, similar to a physical downlink control channel (PDCCH) or a physical uplink control channel (PUCCH) used for cellular communications with a base station 110 via an access link or an access channel. The PSSCH 320 may be used to communicate data, similar to a physical downlink shared channel (PDSCH) or a physical uplink shared channel (PUSCH) used for cellular communications with a base station 110 via an access link or an access channel. For example, the PSCCH 315 may carry sidelink control information (SCI) 330, which may indicate various control information used for sidelink communications, such as one or more resources (for example, time resources, frequency resources, or spatial resources) where a transport block (TB) 335 may be carried on the PSSCH 320. The TB 335 may include data. The PSFCH 325 may be used to communicate sidelink feedback 340, such as hybrid automatic repeat request (HARQ) feedback (for example, acknowledgement or negative acknowledgement (ACK/NACK) information), transmit power control (TPC), or a scheduling request (SR).

Although shown on the PSCCH 315, in some examples, the SCI 330 may include multiple communications in different stages, such as a first stage SCI (SCI-1) and a second stage SCI (SCI-2). The SCI-1 may be transmitted on the PSCCH 315. The SCI-2 may be transmitted on the PSSCH 320. The SCI-1 may include, for example, an indication of one or more resources (for example, time resources, frequency resources, or spatial resources) on the PSSCH 320, information for decoding sidelink communications on the PSSCH, a quality of service (QoS) priority value, a resource reservation period, a PSSCH demodulation reference signal (DMRS) pattern, an SCI format for the SCI-2, a beta offset for the SCI-2, a quantity of PSSCH DMRS ports, or a modulation and coding scheme (MCS). The SCI-2 may include information associated with data transmissions on the PSSCH 320, such as a hybrid automatic repeat request (HARQ) process ID, a new data indicator (NDI), a source identifier, a destination identifier, or a channel state information (CSI) report trigger.

In some examples, the one or more sidelink channels 310 may use resource pools. For example, a scheduling assignment (for example, included in SCI 330) may be transmitted in sub-channels using specific resource blocks (RBs) across time. In some examples, data transmissions (for example, on the PSSCH 320) associated with a scheduling assignment may occupy adjacent RBs in the same subframe as the scheduling assignment (for example, using frequency division multiplexing). In some examples, a scheduling assignment and associated data transmissions are not transmitted on adjacent RBs.

In some examples, a UE 305 may operate using a sidelink transmission mode (for example, Mode 1) where resource selection or scheduling is performed by a base station 110. For example, the UE 305 may receive a grant (for example, in downlink control information (DCI) or in a radio resource control (RRC) message, such as for configured grants) from the base station 110 for sidelink channel access or scheduling. In some examples, a UE 305 may operate using a transmission mode (for example, Mode 2) where resource selection or scheduling is performed by the UE 305 (for example, rather than a base station 110). In some examples, the UE 305 may perform resource selection or scheduling by sensing channel availability for transmissions. For example, the UE 305 may measure a received signal strength indicator (RSSI) parameter (for example, a sidelink-RSSI (S-RSSI) parameter) associated with various sidelink channels, may measure a reference signal received power (RSRP) parameter (for example, a PSSCH-RSRP parameter) associated with various sidelink channels, or may measure a reference signal received quality (RSRQ) parameter (for example, a PSSCH-RSRQ parameter) associated with various sidelink channels, and may select a channel for transmission of a sidelink communication based at least in part on the measurement(s).

Additionally or alternatively, the UE 305 may perform resource selection or scheduling using SCI 330 received in the PSCCH 315, which may indicate occupied resources or channel parameters. Additionally or alternatively, the UE 305 may perform resource selection or scheduling by determining a channel busy rate (CBR) associated with various sidelink channels, which may be used for rate control (for example, by indicating a maximum quantity of resource blocks that the UE 305 can use for a particular set of subframes).

In the transmission mode where resource selection or scheduling is performed by a UE 305, the UE 305 may generate sidelink grants, and may transmit the grants in SCI 330. A sidelink grant may indicate, for example, one or more parameters (for example, transmission parameters) to be used for an upcoming sidelink transmission, such as one or more resource blocks to be used for the upcoming sidelink transmission on the PSSCH 320 (for example, for TBs 335), one or more subframes to be used for the upcoming sidelink transmission, or a modulation and coding scheme (MCS) to be used for the upcoming sidelink transmission. In some examples, a UE 305 may generate a sidelink grant that indicates one or more parameters for semi-persistent scheduling (SPS), such as a periodicity of a sidelink transmission. Additionally or alternatively, the UE 305 may generate a sidelink grant for event-driven scheduling, such as for an on-demand sidelink message.

In some cases, a sidelink communication may become corrupted (for example, as a result of a transmission error). This corruption may be referred to as an "erasure" of the communication. The sidelink communication may be retransmitted by a network node, such as a base station or a UE (for example, an RSU), using network coding. The network node may be referred to herein as an "encoder device." The UE 305 may be configured to recover the erased communication based at least in part on the retransmission using network coding, as explained in more detail elsewhere herein.

Figure 4:
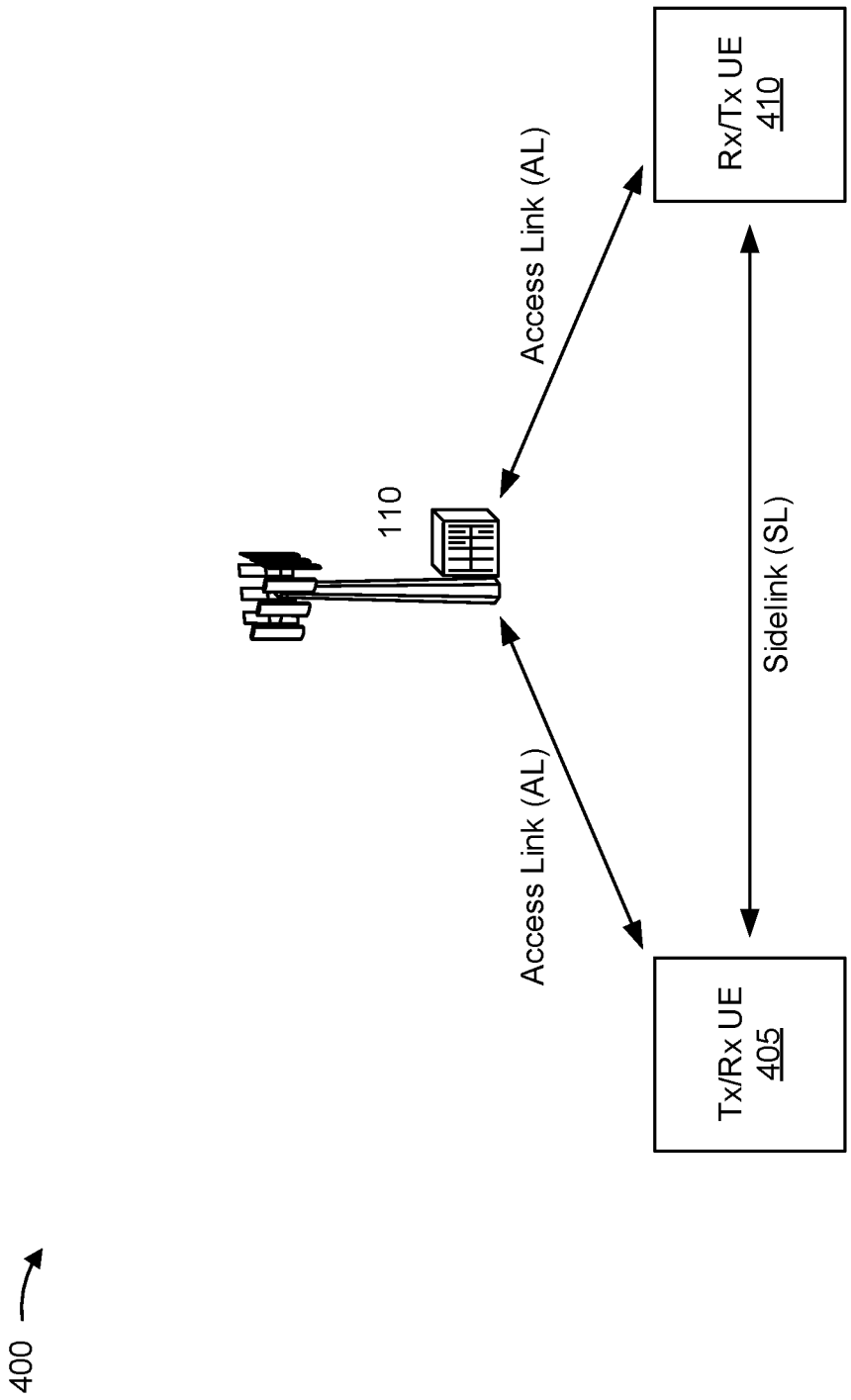
FIG. 4 is a diagram illustrating an example of sidelink communications and access link communications, in accordance with the present disclosure.

FIG. 4 is a diagram illustrating an example of sidelink communications and access link communications 400, in accordance with the present disclosure. As shown in FIG. 4, a transmitter (Tx)/receiver (Rx) UE 405 and an Rx/Tx UE 410 may communicate with one another via a sidelink, as described above in connection with FIG. 3. As further shown, in some sidelink modes, a base station 110 may communicate with the Tx/Rx UE 405 via a first access link.

Additionally or alternatively, in some sidelink modes, the base station 110 may communicate with the Rx/Tx UE 410 via a second access link. The Tx/Rx UE 405 or the Rx/Tx UE 410 may correspond to one or more UEs described elsewhere herein, such as the UE 120 of FIG. 1. Thus, a direct link between UEs 120 (for example, via a PC5 interface) may be referred to as a sidelink, and a direct link between a base station 110 and a UE 120 (for example, via a Uu interface) may be referred to as an access link. Sidelink communications may be transmitted via the sidelink, and access link communications may be transmitted via the access link. An access link communication may be either a downlink communication (from a base station 110 to a UE 120) or an uplink communication (from a UE 120 to a base station 110).

Figure 5:
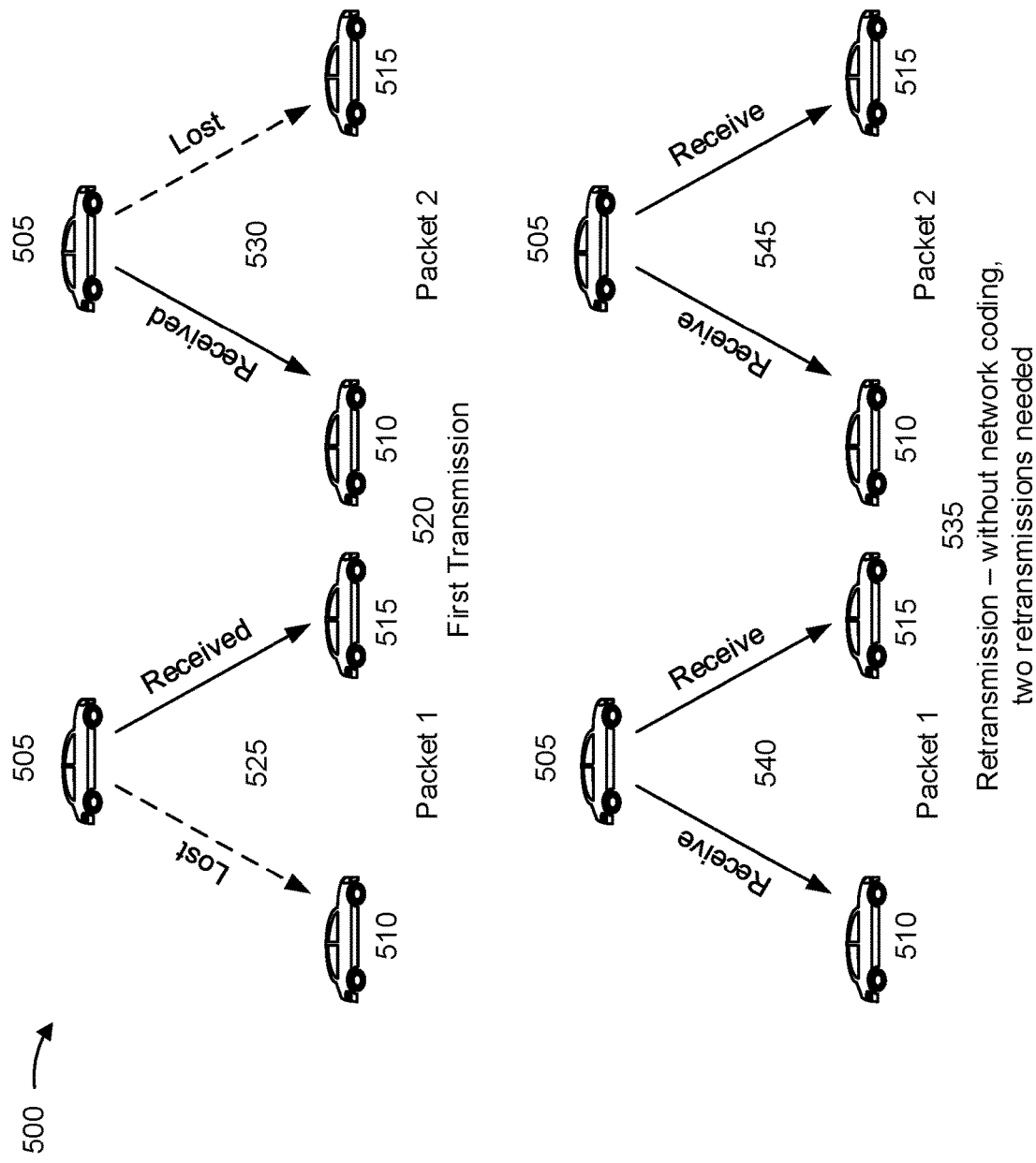
FIG. 5 is a diagram illustrating an example of sidelink communications without using network coding, in accordance with the present disclosure.

FIG. 5 is a diagram illustrating an example of sidelink communications 500 without using network coding, in accordance with the present disclosure. As shown in FIG. 5, a UE, such as a transmitting UE 505, may transmit communications to one or more receiving UEs, and may be associated with an RSU, a network node, or a base station, among other examples. For example, the transmitting UE 505 may transmit one or more communications to a first receiving UE 510 associated with a first receiving vehicle and a second receiving UE 515 associated with a second receiving vehicle. In some examples, the transmitting UE 505 may relay one or more communications received from an originating UE (not shown) to the first receiving UE 510 and to the second receiving UE 515. The UEs 505, 510, or 515 may correspond to one or more UEs described elsewhere herein, such as the UE 120 or the UE 305.

In a first operation 520, in a first transmission, the transmitting UE 505 may transmit a first communication and a second communication to a first receiving UE 510 associated with a first receiving vehicle and to a second receiving UE 515 associated with a second receiving vehicle. In some examples, the communications may be P2P communications, such as sidelink communications. Additionally or alternatively, the communications may include packets. For example, the first communication may be a P2P communication that includes a first packet (for example, "Packet 1") and the second communication may be a second P2P communication that includes a second packet (for example, "Packet 2"). However, the communications are not limited to P2P communications, and are not limited to including packets, and may be any type of communication. In a second operation 525, the first receiving UE 510 may fail to receive the first communication, and the second receiving UE 515 may receive the first communication. In a third operation 530, the first receiving UE 510 may receive the second communication, and the second receiving UE 515 may fail to receive the second communication.

In a fourth operation 535, if the transmitting UE 505 does not use network coding, then the transmitting UE 505 may retransmit both the first communication and the second communication (for example, for a total of two retransmissions). For example, in a fifth operation 540, the transmitting UE 505 may retransmit the first communication because the first receiving UE 510 previously failed to receive the first communication. Furthermore, in a sixth operation 545, the transmitting UE 505 may retransmit the second communication because the second receiving UE 515 previously failed to receive the second communication.

As described in more detail below, network coding may be used to combine communications, thereby reducing the quantity of required retransmissions. Network coding may provide advantages associated with retransmission without increasing network load or interference, thereby improving network performance.

Figure 6:
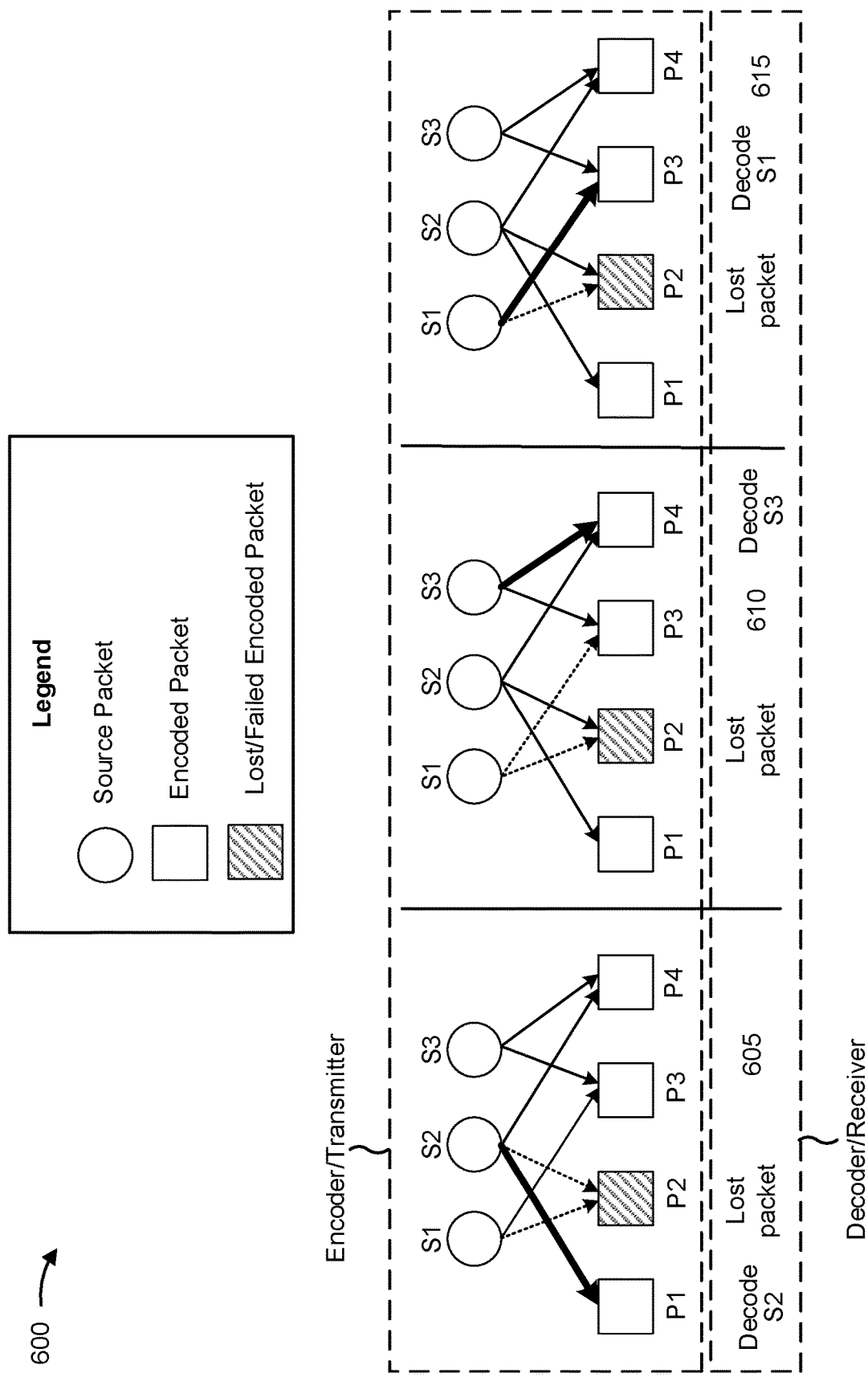
FIG. 6 is a diagram illustrating an example of network coding, in accordance with the present disclosure.

FIG. 6 is a diagram illustrating an example of network coding 600, in accordance with the present disclosure. As shown in FIG. 6, an encoder device (or transmitter) may communicate with a decoder device (or receiver). The encoder device is sometimes also referred to as a transmitter, an encoder node, or a transmitter node. The encoder may include a UE 120, a base station 110, an RSU, or an integrated access and backhaul (IAB) device, among other examples. An IAB device may include an IAB donor (for example, a central unit (CU) of an IAB donor or a distributed unit (DU) of an IAB donor) or an IAB node (for example, a DU of an IAB node or a mobile termination (MT) of an IAB node). The decoder device is sometimes also referred to as a receiver, a decoder node, or a receiver node. The decoder device may include a UE 120, a base station 110, an RSU, or an IAB device, among other examples.

As shown in FIG. 6, an encoder device (or transmitter) may encode data, shown as a set of source packets or original packets (p1, p2, and p3), into a set of encoded packets using network coding. While the example of FIG. 6 uses packets as example data, the data may include any type of communication (for example, TBs), and is not limited to packets. An encoded packet may be the same as a source packet, may be a redundancy version of a source packet, may include a combination of multiple source packets (for example, a subset of the source packets), or may include a redundancy version of the combination. The quantity of encoded packets may be the same as or different than the quantity of source packets. In some examples, the quantity of encoded packets may be unlimited (for example, the encoder device may generate any quantity of encoded packets), such as when using a rateless network coding scheme. For example, as shown in FIG. 6, the encoder device may encode K source packets (where K=3) into N encoded packets (where N=4). The encoder device transmits the encoded packets to a decoder device (or receiver). The decoder device uses network coding to decode the encoded packets and recover the source packets. As used herein, network coding may be performed using any type of network coding scheme, such as fountain coding, linear network coding, random linear network coding, Luby transform (LT) network coding, or Raptor network coding, among other examples.

As further shown in FIG. 6, the encoder device encodes three source packets (S1, S2, and S3) into four encoded packets: P1 (for example, that carries S2), P2 (for example, that carries S1+S2), P3 (for example, that carries S1+S3), and P4 (for example, that carries S2+S3). The encoder device may transmit the four encoded packets to the decoder device. In this example, the packet P2 (carrying S1+S2) is not successfully received by the decoder. In a first operation 605, the decoder device decodes the packet P1 (carrying S2). In a second operation 610, the decoder device obtains S3 from the packet P4 (carrying S2+S3) because the decoder device has already decoded S2 and can use combining to obtain S3 from S2+S3. In a third operation 615, the decoder device obtains S1 from the packet P3 (carrying S1+S3) because the decoder device has already decoded S3 and can use combining to obtain S1 from S1+S3. In some examples, an encoded packet may include an indication (for example, in a header of the encoded packet) that indicates the source packet(s) that are included in the encoded packet. Thus, the decoder device can obtain S1, S2, and S3 despite P2 failing, and using less overhead than packet data convergence protocol (PDCP) duplication. For example, PDCP duplication may duplicate all of the source packets for a total of six transmissions, while the example network coding shown in FIG. 6 uses four transmissions.

In some cases, the encoder device may continue to transmit encoded packets (for example, the same combination of encoded packets or different combinations of encoded packets) to the decoder device until the encoder device receives a notification from the decoder device. For example, the decoder device may successfully receive the source packets or may abort decoding, which may trigger the decoder device to send a notification to the encoder device. The notification may include, for example, an acknowledgement (ACK) or a stop message (STOP). In some cases, the decoder device may transmit an ACK for each original packet that is successfully received. Additionally or alternatively, the decoder device may transmit an ACK upon successful reception of all of the source packets. Upon receiving the notification, the encoder device may encode additional data (for example, a new set of source packets, such as S4, S5, and S6), and may transmit encoded packets to the decoder, in a similar manner as described above, until all of the data has been transmitted or successfully received. Alternatively, to conserve network resources and reduce overhead, the encoder device may not transmit an ACK or a negative acknowledgement (NACK) for received packets.

In some cases, such as when using a Raptor network coding scheme, the encoder device may perform inner coding, or precoding, to generate a set of intermediate packets, that include a set of redundant packets, from the source packets. A redundant packet may be a copy of a source packet or a redundancy version of a source packet. In some examples, a redundant packet may be a low density parity check (LDPC) packet. For example, the encoder device may apply inner coding to generate K' intermediate packets (for example, original plus redundant packets from K source packets). The encoder may then perform outer coding (for example, fountain coding or LT network coding) to generate N encoded packets from the K' intermediate packets, in a similar manner as described above. As a result, the encoding or decoding complexity of the Raptor network coding scheme may be linear. The encoded packets may include a set of systemic packets and a set of repair packets. In some examples, the decoder device may choose to not decode a packet included in the set of systematic symbols that has a high decoding complexity (for example, is associated with a high encoding degree or is associated with a high quantity of source packets). The decoder device may recover the source packets associated with the packet that is not decoded from one or more packets included in the set of repair packets. The one or more packets included in the set of repair packets may be associated with a lower decoding complexity. As a result, the decoding complexity may be reduced.

In some examples, the network coding may be viewed as a linear system (for example, over a Galois field) with three variables and four linearly independent constraints. For example, the three variables may correspond to the original packets (for example, p1, p2, and p3) and the four linearly independent constraints may correspond to the four encoded packets (for example, the four encoded packets that carry p2, p1+p2, p1+p3, and p2+p3). Using the linear system, any of the three variables that have been subject to an erasure (for example, a transmission error) may be recovered based at least in part on a portion of the three original packets and based at least in part on a portion of the four encoded packets. An example representation of the linear system is shown below:

$$\begin{bmatrix} 1 & 0 & 0 \\ 0 & 1 & 0 \\ 0 & 0 & 1 \\ 1 & 1 & 1 \end{bmatrix} \cdot [a \ b \ c]^T = [a \ b \ c \ a \oplus b \oplus c]^T$$

where a, b, and c correspond to the three original packets, and T represents a transpose of the function.

Network coding and recovery may enable a UE to recover a communication that has been erased (for example, lost or corrupted) during transmission. The recovery of the erased communications, without requiring retransmission by the network node, may reduce the overall quantity of retransmissions by the network node and may reduce the overall load on the network.

Figure 7:
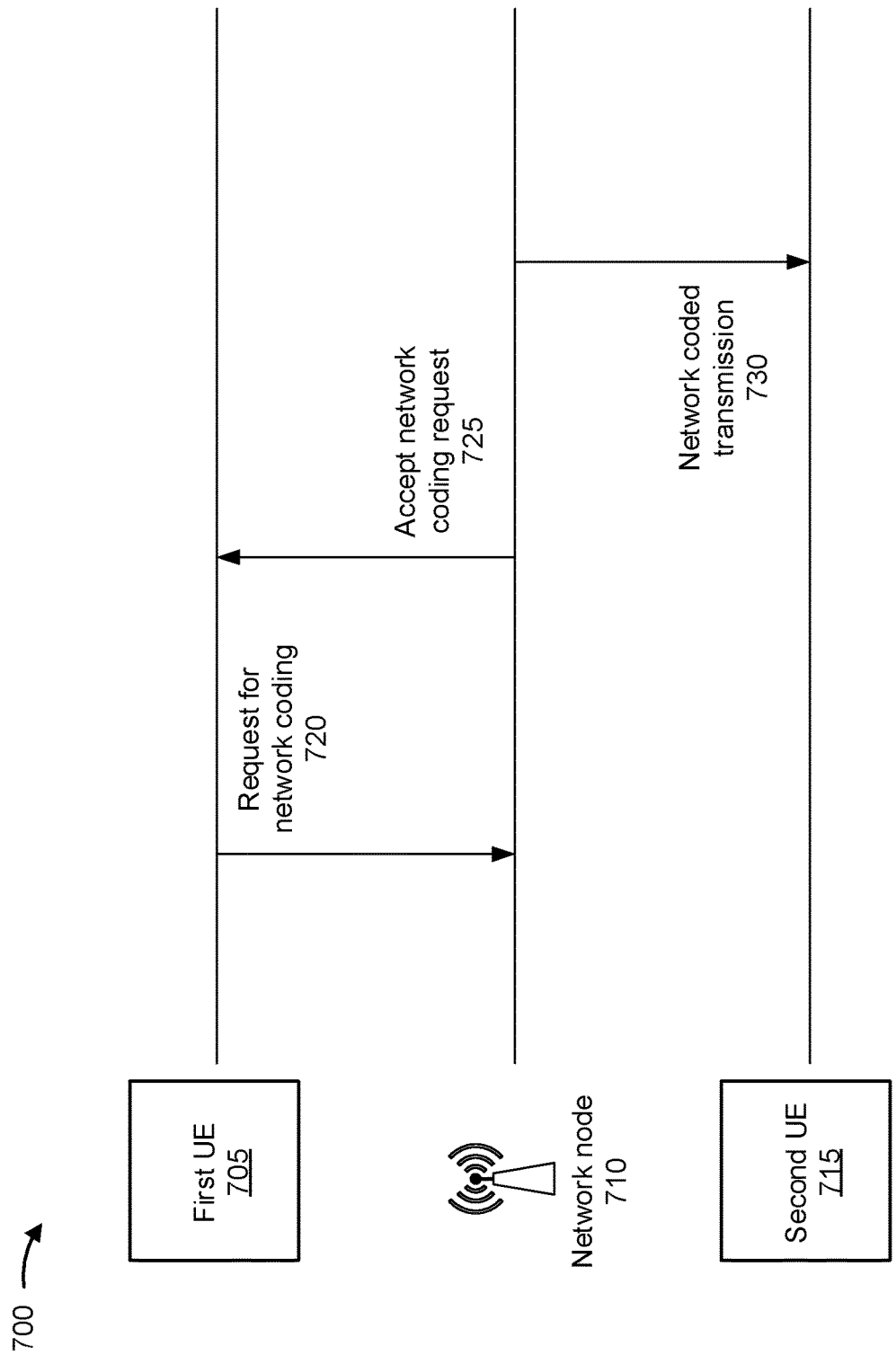
FIG. 7 is a diagram illustrating an example of network coding using a single encoder device, in accordance with the present disclosure.

FIG. 7 is a diagram illustrating an example of network coding 700 using a single encoder device, in accordance with the present disclosure. As shown in FIG. 7, a first UE 705 and a second UE 715 may be in communication with a encoder device 710. In some examples, the first UE 705 may be a transmitting UE associated with a first vehicle and the second UE 715 may be a receiving UE associated with a second vehicle. However, one or both of the first UE 705 and the second UE 715 may be configured to receive and transmit data. The encoder device 710 may be a base station, an RSU, a network node, or a UE, among other examples. The first UE 705, the encoder device 710, or the second UE 715 may correspond to one or more of the UEs described herein, such as UE 120, UE 305, UE 505, UE 510, or UE 515.

In a first operation 720, the first UE 705 may transmit, and the encoder device 710 may receive, a request for network coding. Network coding may be used to combine communications, such as by combining a first communication and a second communication in a similar manner as described elsewhere herein, such as in connection with FIG. 6. The first UE 705 may transmit the request for network coding to the encoder device 710 based at least in part on a configuration associated with the UE 705 or a configuration associated with the encoder device 710. For example, the first UE 705 may be configured to transmit all network coding requests to the encoder device 710. In some examples, the encoder device 710 may be the only encoder device within an area associated with the first UE 705 or may otherwise be the default encoder device to which the first UE 705 transmits all network coding requests.

In a second operation 725, the encoder device 710 may accept the network coding request. In some examples, the encoder device 710 may be the only encoder device configured to accept network coding requests from the first UE 705 or may be the default encoder device for performing network coding for the first UE 705. The encoder device 710 may transmit, and the first UE 705 may receive, an indication that the encoder device 710 has accepted the request to perform the network coding.

In a third operation 730, the encoder device 710 may transmit, and the second UE 715 may receive, a transmission using network coding. The transmission using network coding may include a function of the first communication and the second communication, such as a combination of the first communication and the second communication using an exclusive or (XOR) operation.

As described above (for example, in connection with FIG. 5), an encoder device may transmit a first communication and a second communication to a first receiving UE and a second receiving UE. The first receiving UE may fail to receive the first communication, but may receive the second communication, while the second receiving UE may receive the first communication, but may fail to receive the second communication. If the encoder device does not use network coding, then the encoder device may be required to retransmit both the first communication and the second communication (for example, for a total of two retransmissions). For example, the encoder device may retransmit the first communication because the first receiving UE previously failed to receive the first communication, and may retransmit the second communication because the second receiving UE previously failed to receive the second P2P communication.

In contrast, if the encoder device uses network coding to combine the communications, then the encoder device may only need to retransmit a single communication. In some examples, the single communication may be a combined communication that includes both the first communication and the second communication. Thus, the use of network coding may reduce the quantity of resources required for the retransmission, and thus reduce the overall load on the network.

In some cases, a base station (for example, a base station 110) may determine packets or TBs that are to be included in a network coded retransmission. For example, in the Mode 1 transmission mode, where resource selection or scheduling is performed by a base station, the base station may coordinate UEs, RSUs, and encoding devices in a sidelink network. In such examples, the base station may determine data, such as packets or TBs, that are to be retransmitted. For example, the base station may receive feedback from one or more UEs indicating sidelink communications associated with an erasure or a failed transmission. In some cases, another device (such as an encoder device), rather than the base station, may transmit a network coded sidelink retransmission that combines data from the sidelink communications associated with an erasure or a failed transmission. However, the encoder device may be unaware of the packets or TBs to include in the network coded sidelink retransmission because UEs in the sidelink network may be operating in the Mode 1 transmission mode (for example, where feedback is provided to the base station and not the encoder device or other UEs). This may result in the encoder device transmitting a network coded sidelink retransmission that does not include data associated with a sidelink transmission that previously failed, thereby resulting in that data being retransmitted again in a subsequent sidelink transmission or network coded retransmission. Additionally, the base station may be unaware of data that is stored (for example, in a buffer) by the encoder device. As a result, the base station may request that an encoder device include data (for example, a packet or a TB) in a network coded sidelink retransmission when the encoder device does not have access to the data. This may result in an encoding failure or may result in the data not being included in the network coded sidelink retransmission.

Various aspects relate generally to signaling for network coded sidelink retransmissions. Some aspects more specifically relate to a base station transmitting, to an encoder device (for example, an RSU, a UE, or another device) an indication of a set of TBs (or packets) for a network coded sidelink retransmission where the set of TBs are associated with one or more sidelink transmissions. The base station may transmit the set of TBs in accordance with a buffer configuration of the encoder device or a buffer report associated with the encoder device. For example, in some aspects, the base station may transmit, and the encoder device may receive, the buffer configuration which may indicate a type of TB that is to be stored (for example, buffered) by the encoder device. Additionally or alternatively, the encoder device may transmit, and the base station may receive, the buffer status report which may indicate TBs that are currently stored (for example, in a buffer) by the encoder device. Therefore, the base station may ensure (or increase a likelihood) that the set of TBs indicated by the base station (for example, to be included in the network coded sidelink retransmission) are stored by the encoder device. The encoder device may transmit the network coded sidelink retransmission based at least in part on encoding TBs, included in the set of TBs, that are stored in a buffer of the encoder device to generate the network coded sidelink retransmission.

In some aspects, the base station may allocate PUCCH resources for the encoder device to provide feedback, to the base station, associated with the network coded sidelink retransmission. For example, the encoder device may use the PUCCH resources to transmit an indication of whether the indicated set of TBs are stored by the encoder device. As another example, the encoder device may use the PUCCH resources to transmit an indication of whether the network coded sidelink retransmission is successfully decoded by one or more receivers (for example, by one or more UEs).

In some aspects, an action to be performed based at least in part on one or more TBs, from the indicated set of TBs, not being included in the buffer of the encoder device, is configured by the base station or defined (for example, by a wireless communication standard). The action performed by the encoder device may include refraining from transmitting the network coded sidelink retransmission or, alternatively, the encoder device transmitting the network coded sidelink retransmission without including the one or more TBs in the network coded sidelink retransmission.

In some aspects, buffers of the base station and one or more encoder devices may be synchronized. For example, when UE feedback (for example, an ACK message) is transmitted to the base station, the base station may transmit, to the one or more encoder devices, an indication to remove the TBs or packets that have been successfully decoded by one or more UEs (for example, TBs or packets that are associated with an ACK message). When UE feedback is transmitted to the one or more encoder devices, an encoder device may transmit, to the base station, an indication to remove the TBs or packets that have been successfully decoded by one or more UEs. In this way, the TBs or packets stored by the base station and the one or more encoder devices may be synchronized.

Particular aspects of the subject matter described in this disclosure can be implemented to realize one or more of the following potential advantages. In some examples, the described techniques can be used to enable network coded sidelink retransmissions by an encoder device (for example, a device other than a base station) when a base station is managing sidelink scheduling or resource allocation (for example, in a Mode 1 transmission mode). Enabling network coded sidelink retransmissions in a sidelink network may reduce an overall quantity of retransmissions in the sidelink network, thereby conserving resources and reducing an overall load on the network. Additionally, enabling the encoder device to transmit the network coded sidelink retransmissions may expand a coverage area and may improve a reliability of the network coded sidelink retransmissions (for example, compared to a coverage area or reliability of the network coded sidelink retransmissions if the network coded sidelink retransmissions were only transmitted by the base station).

As another example, enabling the encoder device to transmit, to the base station, an indication of whether the indicated set of TBs are stored by the encoder device or an indication of whether the network coded sidelink retransmission is successfully decoded by one or more receivers may improve resource allocation or scheduling determinations made by the base station. For example, the base station may be enabled to transmit TBs, that were not stored by the encoder device, to the encoder device to enable the encoder device to generate or transmit the network coded sidelink retransmission. Additionally, the encoder device performing one or more actions based at least in part on one or more TBs, from the indicated set of TBs, not being included in the buffer of the encoder device may improve an efficiency and reliability of the network coded sidelink retransmissions (for example, because all devices in the sidelink network may be synchronized as to what action(s) the encoder device will perform when one or more TBs, from the indicated set of TBs, are not included in the buffer of the encoder device).

Figure 8:
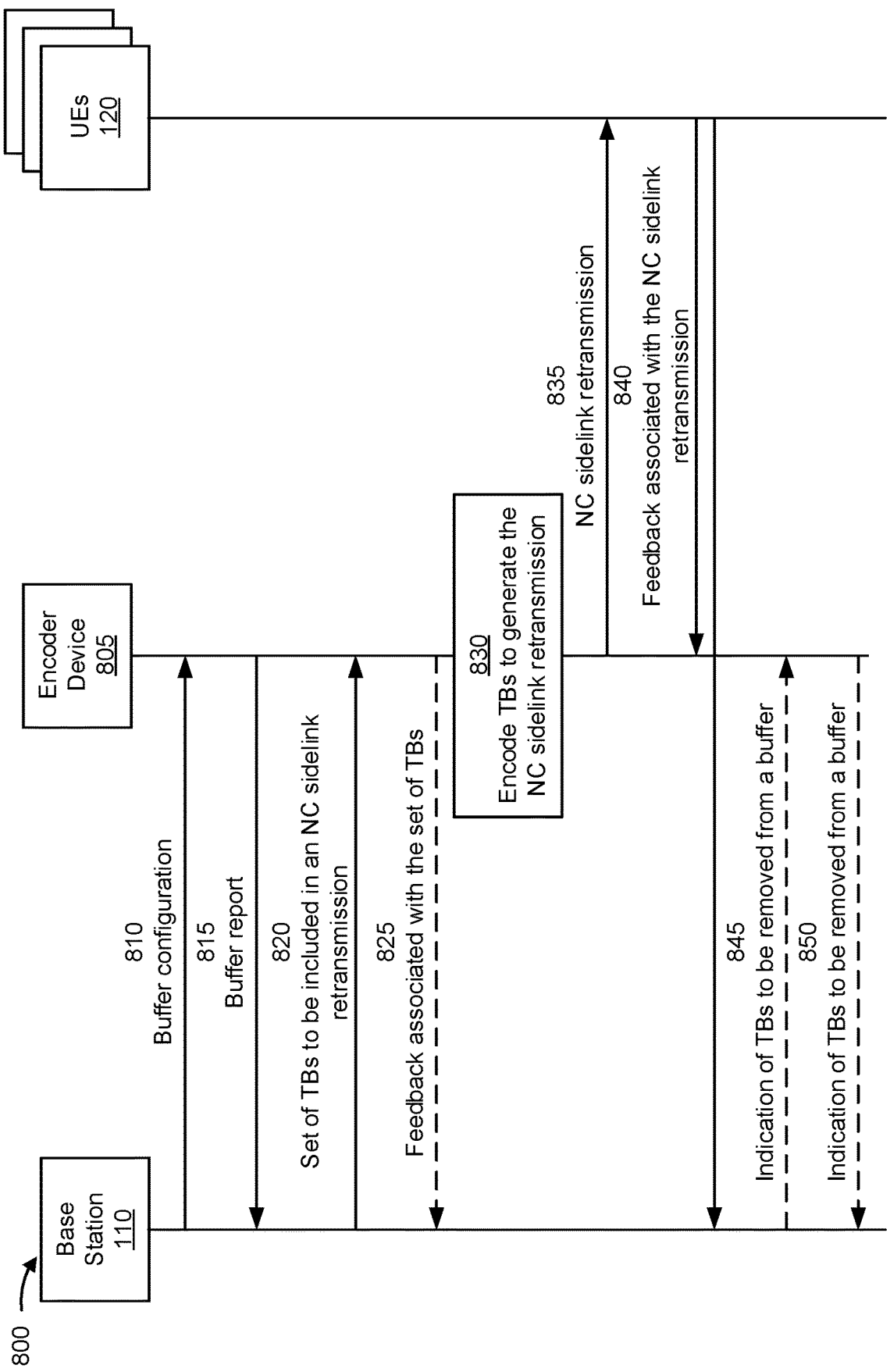
FIG. 8 is a diagram illustrating an example associated with signaling for network coded sidelink retransmissions, in accordance with the present disclosure.

FIG. 8 is a diagram illustrating an example associated with signaling 800 for network coded sidelink retransmissions, in accordance with the present disclosure. As shown in FIG. 8, a base station 110, an encoder device 805, and one or more UEs 120 may communicate with one another in a wireless network, such as the wireless network 100. For example, the encoder device and the one or more UEs may communicate with one another via a sidelink (for example, in a similar manner as described in connection with FIGS. 3 and 4). The one or more UEs 120 may correspond to any of the UEs described above, such as the UE 305, the UE 505, the UE 510, the UE 515, the UE 705, or the UE 715. The encoder device 805 may be a network node for network coding based retransmission of communications transmitted via the sidelink. The encoder device 805 may be a UE, an RSU, a base station, a vehicle, or another device. While FIG. 8 depicts a single encoder device 805, in some aspects, the base station 110 may communicate with multiple encoder devices 805 in a similar manner as described herein. Some examples are described herein in connection with TBs. However, operations described herein are not limited to only TBs and the operations described herein may be applicable to any type of communication, such as packets. In other words, "TBs" or "transport blocks" may be used interchangeably herein with "packets."

In a first operation 810, in some aspects, the base station 110 may transmit, and the encoder device 805 may receive, a buffer configuration. The buffer configuration may indicate a type of TBs or packets that are to be buffered by the encoder device 805 (for example, that are to be stored in a buffer of the encoder device 805). For example, the buffer configuration may indicate the type of TBs or packets that are to be buffered by the encoder device 805 and a duration (for example, an amount of time) that the TBs are to be stored in the buffer by the encoder device 805.

In some aspects, the base station 110 may transmit the buffer configuration via an RRC message, a medium access control (MAC) control element (MAC-CE) message, a PDCCH message, a PDSCH message, or another type of message. In some aspects, the buffer configuration may be configured for an amount of time (for example, the buffer configuration may be a semi-static configuration). In some other aspects, the buffer configuration may be persistent (for example, the buffer configuration may be active or valid until the base station 110 transmits a reconfiguration of the buffer configuration). In some aspects, the buffer configuration may be included in a unicast message associated with the encoder device 805. For example, the buffer configuration may be a one-to-one transmission from one point in the network to another point (for example, from the base station 110 to the encoder device 805). In some other aspects, the buffer configuration may be included in a multicast message associated with multiple encoder devices (for example, that include the encoder device 805). In other words, the buffer configuration may be a one-to-many transmission that is associated with multiple encoder devices. In such examples, the same buffer configuration may be applied by the multiple encoder devices.

In some aspects, the buffer configuration may indicate one or more parameters. In other words, the TBs that are to be buffered by the encoder device may be based at least in part on the one or more parameters indicated by the buffer configuration. The one or more parameters may include a time window associated with an initial transmission time of the TBs or packets that are to be buffered by the encoder device 805. For example, TBs or packets may be transmitted (for example, initially) by a UE 120. The encoder device 805 may be configured to buffer TBs or packets that are transmitted via the sidelink during certain time windows. As another example, the one or more parameters may include a remaining packet delay budget (PDB) of the TBs or packets that are to be buffered by the encoder device 805. For example, each TB or packet transmitted via the sidelink may be associated with a PDB. The encoder device 805 may be configured to buffer TBs or packets associated with a remaining PDB. For example, the one or more parameters may indicate a threshold PDB. The encoder device 805 may buffer (for example, store in a buffer) TBs or packets associated with a remaining PDB that satisfy the threshold.

As another example, the one or more parameters may include one or more source identifiers of the TBs or the packets that are to be buffered by the encoder device 805. For example, as described above, TBs or packets may be transmitted (for example, initially) by a UE 120. The UE 120 that initially transmitted a TB or packet may be a "source" for the TB or packet (for example, a source identifier for a TB or packet may be an identifier of a transmitter, such as a UE 120, of the TB or the packet). The encoder device 805 may be configured to buffer TBs or packets associated with certain source identifiers (for example, the buffer configuration may indicate a list of source identifiers). In some aspects, the one or more parameters may include one or more destination identifiers of the TBs or the packets that are to be buffered by the encoder device 805. For example, an intended recipient of a TB or a packet may be a "destination" of the TB or the packet (for example, a destination identifier for a TB or packet may be an identifier of a receiver, such as a UE 120, of the TB or the packet). The encoder device 805 may be configured to buffer TBs or packets associated with certain destination identifiers (for example, the buffer configuration may indicate a list of destination identifiers).

As another example, the one or more parameters may include a threshold quantity of retransmissions to be associated with the TBs or the packets that are to be buffered by the encoder device 805. For example, an initial transmitter of a TB or a packet may retransmit the TB or the packet based at least in part on the initial transmission failing. The encoder device 805 may be configured to buffer TBs or packets that have been transmitted at least (for example, greater than or equal to) the threshold quantity of retransmissions by the initial transmitter (for example, the source) of the TBs or the packets. In some aspects, the one or more parameters may include a priority threshold for a priority of the TBs or the packets that are to be buffered by the encoder device 805. For example, sidelink data (for example, TBs or packets) may be associated with a priority level. In some aspects, there may be 8 or a different quantity of priority levels. In some aspects, the encoder device 805 may be configured to buffer TBs or packets that have a priority level that satisfies the priority threshold. In other words, the encoder device 805 may be configured to buffer TBs or packets that are associated with certain priority levels. For example, the encoder device 805 may be configured to buffer TBs or packets that have a high priority.

As another example, the one or more parameters may include location information of the TBs or the packets that are to be buffered by the encoder device 805. For example, the buffer configuration may indicate one or more location zone identifiers, or other location information, associated with transmitters or receivers of the TBs or the packets that are to be buffered by the encoder device 805. In other words, the encoder device 805 may be configured to buffer TBs or packets that are transmitted in a certain geographic zone or location. The buffer configuration may indicate one or more (or all) of the parameters described above. In some aspects, the buffer configuration may indicate any combination of the parameters described above.

The buffer configuration may enable the base station 110 to determine TBs or packets that are stored by the encoder device 805. For example, the encoder device may store or buffer packets or TBs in accordance with the buffer configuration. Therefore, the base station 110 may determine the TBs or packets that are stored by the encoder device 805 without receiving signaling from the encoder device 805 (for example, without receiving a buffer report), thereby conserving resources (for example, time-frequency resources or processing resources) that would have otherwise been associated with the signaling. Additionally or alternatively, the buffer configuration may enable the base station 110 to configure the encoder device 805 to transmit a buffer report less frequently, thereby conserving resources (for example, time-frequency resources or processing resources) associated with transmitting the buffer report. Enabling the base station 110 to determine TBs or the packets that are stored by the encoder device 805 may enable the base station 110 to determine the TBs or the packets that the base station 110 can schedule the encoder device 805 to include in a network coded sidelink retransmission, as described in more detail elsewhere herein.

In a second operation 815, in some aspects, the encoder device 805 may transmit, and the base station 110 may receive, a buffer report. The buffer report may include an indication of TBs or packets that are included in the buffer of the encoder device 805. The buffer report may be included in an uplink control channel message (for example, a PUCCH message). In some aspects, the encoder device 805 may transmit the buffer report based at least in part on a TB or a packet being added to, or removed from, the buffer. In other words, the encoder device 805 may transmit the buffer report based at least in part on the encoder device 805 taking over the transmission of a TB or a packet (for example, based at least in part on the encoder device 805 being triggered to include the TB or the packet in a transmission or a retransmission). Additionally or alternatively, the encoder device 805 may transmit the buffer report based at least in part on a periodic schedule (for example, the encoder device 805 may be configured, such as by the base station 110, to periodically transmit buffer reports). The periodic schedule may be indicated by the base station 110. Additionally or alternatively, the periodic schedule may be pre-defined or pre-configured (for example, by a wireless communication standard, such as the 3GPP).

In some aspects, the buffer report may include, for a TB or packet, a source identifier associated with the TB or the packet, or an identifier (for example, a packet identifier) associated with the TB or the packet, among other examples. The buffer report may include information (for example, the source identifier and the packet identifier) for one or more (or all) TBs or packets included in the buffer of the encoder device 805. For example, in some aspects, the buffer report includes an indication of all TBs or all packets included in the buffer of the encoder device 805. In some other aspects, the buffer report includes an indication of TBs or packets that have been added or removed from the buffer of the encoder device 805 relative to a previous buffer report. For example, the buffer report may include an indication of TBs or packets that have been added or removed from the buffer since a transmission time of a most recently transmitted buffer report.

The buffer report may provide the base station 110 with an explicit indication of the TBs or the packets that are available for the encoder device 805 to include in a network coded sidelink retransmission. This may improve an accuracy of the determination, by the base station 110, of the TBs or the packets that are available for the encoder device 805 to include in a network coded sidelink retransmission. In some aspects, the base station 110 may use a combination of the buffer configuration and one or more buffer reports to determine the TBs or the packets that are available for the encoder device 805 to include in a network coded sidelink retransmission. In some other aspects, the base station 110 may use only the buffer configuration to determine the TBs or the packets that are available for the encoder device 805 to include in a network coded sidelink retransmission (for example, the encoder device 805 may be configured to not transmit buffer reports to the base station 110). In some other aspects, the base station 110 may use only the buffer report(s) to determine the TBs or the packets that are available for the encoder device 805 to include in a network coded sidelink retransmission (for example, the base station 110 may not configure the encoder device 805 with the buffer configuration). In other words, the base station 110 may communicate (for example, transmit or receive), with the encoder device 805, the buffer configuration of the encoder device 805 or the buffer report associated with the encoder device 805 (for example, to enable the base station 110 to determine the TBs or the packets that are available for the encoder device 805 to include in a network coded sidelink retransmission).

In some aspects, the one or more UEs 120 or the encoder device 805 may transmit one or more communications. In some aspects, the communications may be P2P communications, such as sidelink communications. Additionally or alternatively, the communications may include one or more packets or TBs. For example, a first communication from a first UE 120 to a second UE 120 may be a P2P communication that includes a first packet, and a second communication from the first UE 120 to a third UE 120 may be a second P2P communication that includes a second packet. However, the communications are not limited to P2P communications, and are not limited to including packets, and may be any type of communication. In some aspects, one or more of the communications may be transmitted by another UE.

In some aspects, communications, such as the first communication or the second communication, may become lost or corrupted (for example, as a result of a transmission error, channel conditions, changing locations of UEs, or a similar issue). This loss or corruption of the communication may be referred to as an "erasure" of the communication. For example, the second UE 120 may fail to receive the first communication, but may receive the second communication. In contrast, the third UE 120 may receive the first communication, but may fail to receive the second communication. The second UE 120 may therefore have an erasure associated with the first transmission, while the third UE 120 may have an erasure associated with the second transmission. Thus, the first UE 120 or another node may need to retransmit the communications (for example, the first communication and the second communication) such that they are received by the second UE 120 and the third UE 120.

In some aspects, if the first UE 120 or the encoder device 805 does not use network coding to retransmit the communications, then the first UE 120 or the encoder device 805 may need to retransmit both the first communication and the second communication (for example, for a total of two retransmissions). For example, the first UE 120 or the encoder device 805 may retransmit the first communication because the second UE 120 previously failed to receive the first communication. Furthermore, the first UE 120 or the encoder device 805 may retransmit the second communication because the third UE 120 previously failed to receive the second communication. Network coding, as described in detail below, may reduce the quantity of (re)transmissions needed, and may therefore reduce the quantity of resources required for those (re)transmissions. As described herein, network coding may reduce a quantity of resources required, and therefore reduce a load on the network, by combining multiple transmissions into a single transmission. Referring to the example above, network coding may enable the encoder device 805 to combine and retransmit the first communication and the second communication as a single network coded communication. Therefore, the load on the network is reduced (for example, from requiring two resources to requiring one resource).

The encoder device 805 may store one or more TBs or one or more packets (for example, transmitted via a sidelink channel) in the buffer of the encoder device 805. For example, the encoder device 805 may store the one or more TBs or the one or more packets in accordance with the buffer configuration. This may enable the encoder device 805 to have access to the one or more TBs or the one or more packets (for example, to include in a network coded sidelink retransmission, as described in more detail elsewhere herein). In some aspects, a UE 120 that is associated with a failed or erased transmission (for example, a transmitter or receiver of the failed or erased transmissions) may report the failure or erasure to the base station 110. For example, UEs 120 in a sidelink network may transmit, to the base station 110, feedback (for example, ACK or NACK feedback) associated with sidelink communications to enable the base station 110 to schedule retransmissions for failed sidelink communications (for example, in the Mode 1 transmission mode). The base station 110 may identify sidelink data (for example, TBs or packets) that need to be retransmitted. For example, the base station 110 may identify (for example, based at least in part on feedback received from one or more UEs 120) packets or TBs that are to be included in a network coded sidelink retransmission. The packets or the TBs may be associated with one or more sidelink communications. In some aspects, the packets or the TBs may be associated with different sidelink communications or different UEs 120.

In a third operation 820, the base station 110 may transmit, and the encoder device 805 may receive, an indication of a set of TBs (or packets) for a network coded sidelink retransmission. The base station 110 may transmit the set of TBs or packets in accordance with the buffer configuration of the encoder device 805 or a buffer report associated with the encoder device 805. In other words, the base station 110 identify TBs or packets that are available to the encoder device 805 (for example, that are stored in a buffer of the encoder device 805) based at least in part on the buffer configuration or the buffer report. This may ensure (or improve a likelihood) that the set of TBs (or packets) for the network coded sidelink retransmission are available to the encoder device 805. The indication of the set of TBs or packets may be included in a PDCCH message (for example, the base station 110 may use the PDCCH message to transmit the indication of the set of TBs or packets to the encoder device 805). In some aspects, the indication of the set of TBs or packets may be included in a unicast message associated with the encoder device 805 (for example, the message that includes the indication of the set of TBs or packets may be a one-to-one message between the base station 110 and the encoder device 805). In some other aspects, the indication of the set of TBs or packets may be included in a multicast message associated with multiple encoder devices including the encoder device 805 (for example, the message that includes the indication of the set of TBs or packets may be a one-to-many message between the base station 110 and multiple encoder devices).

The indication of a set of TBs (or packets) for the network coded sidelink retransmission may include identifying information for each TB (or packet) included in the set of TBs (or packets). For example, the indication of a set of TBs for the network coded sidelink retransmission may include, for each TB included in the set of TBs, an indication of at least one of a source identifier or a packet identifier. As described elsewhere herein, the source identifier may be an identifier of a source of the TB (for example, an identifier of an initial transmitter of the TB). The source identifier or the packet identifier may be included in a header of the TB. Including the source identifier or the packet identifier in the indication may enable the encoder device to identify the TB (for example, in a buffer of the encoder device 805).

In some aspects, the base station 110 may transmit, and the encoder device 805 may receive, an indication of one or more uplink control channel resources (for example, PUCCH resources) that are to be used for providing feedback associated with the set of TBs (or packets). The indication of the one or more uplink control channel resources may be included in the same message or signal as the indication of a set of TBs for the network coded sidelink retransmission. Alternatively, the indication of the one or more uplink control channel resources may be included in a different message or signal than the indication of a set of TBs for the network coded sidelink retransmission. The one or more uplink control channel resources may include an uplink control channel resource associated with providing an indication of whether the set of TBs are stored in the buffer of the encoder device 805. In other words, the base station 110 may provide resources for the encoder device 805 to indicate, to the base station 110, whether the indicated set of TBs for the network coded sidelink retransmission are available to the encoder device 805 (for example, are stored in the buffer of the encoder device 805). Additionally or alternatively, the one or more uplink control channel resources include an uplink control channel resource associated with providing an indication of whether the network coded sidelink retransmission is successfully decoded by one or more receivers. For example, in some cases, receivers (for example, UEs 120) may provide feedback to the encoder device 805 indicating whether the network coded sidelink retransmission (or a given TB associated with the network coded sidelink retransmission) was successfully decoded by the receivers. The base station 110 may allocate uplink channel resources to the encoder device 805 to provide feedback, to the base station 110, indicating whether the receivers successfully decoded the network coded sidelink retransmission (or a given TB associated with the network coded sidelink retransmission).

In some aspects, in a fourth operation 825, the encoder device 805 may transmit, and the base station 110 may receive, using the one or more uplink control channel resources, the feedback associated with the set of TBs. For example, the encoder device 805 may determine whether the set of TBs (for example, indicated by the base station 110 in the third operation 820) are available to the encoder device 805 (for example, are stored in the buffer of the encoder device 805). If the encoder device 805 identifies one or more TBs, from the set of TBs, that are not available to the encoder device 805, then the encoder device 805 may transmit, to the base station 110, feedback indicating that the one or more TBs, to be included in the network coded sidelink retransmission, are not available to the encoder device 805. This may enable the base station 110 to identify when the encoder device 805 does not have access to all of the TBs that are to be included in the network coded sidelink retransmission. For example, the base station 110 may provide the TBs to the encoder device 805 or may indicate another action performed, or another message to be transmitted, by the encoder device 805.

In some aspects, a rule or action may be defined or configured for scenarios in which the encoder device 805 does not have access to one or more TBs included in the set of TBs (for example, indicated by the base station 110 in the third operation 820) for a network coded sidelink retransmission. For example, the base station 110 may transmit, and the encoder device 805 may receive, an indication of (for example, a configuration indicating) the rule or the action. Additionally or alternatively, the rule or the action may be defined or pre-configured. For example, the rule or the action may be defined, or otherwise fixed, by a wireless communication standard, such as the 3GPP. In some aspects, the rule or the action may include the encoder device 805 refraining from transmitting the network coded sidelink retransmission. In other words, when the encoder device 805 does not have access to one or more TBs to be included in the network coded sidelink retransmission, the encoder device 805 may not perform the network coded sidelink retransmission (for example, may refrain from transmitting the network coded sidelink transmission). In some other aspects, the rule or the action may include the encoder device 805 transmitting the network coded sidelink retransmission without including the one or more TBs in the network coded sidelink retransmission. In other words, the encoder device may exclude the one or more TBs, that the encoder device 805 does not have access to, from the network coded sidelink retransmission. In such examples, the encoder device 805 may encode the TBs, from the set of TBs indicated by the base station 110, that are stored in the buffer of the encoder device 805 to generate the network coded sidelink retransmission (for example, even if this results in less than all of the TBs from the set of TBs being included in the network coded sidelink retransmission).

In a fifth operation 830, the encoder device may encode TBs (for example, TBs indicated by the base station 110 in the third operation 820) to generate the network coded (NC) sidelink retransmission. For example, the encoder device 805 may encode TBs, included in the set of TBs, that are stored in a buffer of the encoder device 805 to generate the network coded sidelink retransmission. In some aspects, all of the TBs from the set of TBs may be encoded to generate the network coded sidelink retransmission. In some other aspects, less than all of the TBs, from the set of TBs, may be encoded to generate the network coded sidelink retransmission (for example, when the encoder device 805 does not have all of the TBs, from the set of TBs, stored in the buffer of the encoder device 805). The encoder device 805 may encode the TBs in a similar manner as described in more detail elsewhere herein, such as in connection with FIG. 6.

In a sixth operation 835, the encoder device 805 may transmit the network coded sidelink retransmission. For example, the encoder device 805 may transmit the network coded sidelink retransmission based at least in part on encoding TBs, included in the set of TBs, that are stored in a buffer of the encoder device to generate the network coded sidelink retransmission, as described above. The encoder device 805 may transmit the network coded sidelink retransmission to the one or more UEs 120. The encoder device 805 may transmit the network coded sidelink retransmission using a sidelink channel, such as the PSSCH. The network coded sidelink retransmission may include a set of encoded TBs. The set of encoded TBs may be based at least in part on the set of TBs (for example, that are indicated by the base station 110 in the third operation 820).

The one or more UEs 120 may receive the network coded sidelink retransmission and may attempt to decode the network coded sidelink retransmission. For example, a UE 120, of the one or more UEs 120, may decode the network coded sidelink retransmission to attempt to recover a TB or a packet (for example, that was intended for the UE 120) from a previous sidelink communication that failed. Another UE 120, of the one or more UEs 120, may decode the network coded sidelink retransmission to attempt to recover a different TB or a different packet (for example, that was intended for the other UE 120) from a different previous sidelink communication that failed. In this way, the network coded sidelink retransmission may reduce a quantity of retransmissions needed for the one or more UEs 120 to recover TBs or packets from different sidelink communications (for example, because only a single retransmission is needed for the one or more UEs 120 to recover TBs or packets from different sidelink communications).

In a seventh operation 840, the one or more UEs 120 may transmit feedback associated with the network coded sidelink retransmission. The feedback may indicate whether TBs, from the set of TBs associated with the network coded sidelink retransmission, were successfully decoded or recovered by the one or more UEs. For example, if a UE 120, of the one or more UEs 120, successfully decodes or recovers a TB, from the set of TBs, based at least in part on receiving or decoding the network coded sidelink retransmission, then the UE 120 may transmit ACK feedback for the TB. Alternatively, if the UE 120 fails to decode or recover the TB based at least in part on receiving or decoding the network coded sidelink retransmission, then the UE 120 may transmit NACK feedback for the TB. In some aspects, the one or more UEs 120 may transmit the feedback to the encoder device 805. Additionally or alternatively, the one or more UEs 120 may transmit the feedback to the base station 110. The one or more UEs 120 may transmit the feedback to the base station 110 or the encoder device 805 based at least in part on a configuration of the sidelink channel (for example, the configuration may indicate to which device the one or more UEs 120 are to transmit the feedback).

The encoder device 805 and the base station 110 may synchronize which TBs or packets have been successfully decoded or recovered by the UEs 120. For example, this may enable the buffers of the base station 110 and the encoder device 805 to be synchronized. In other words, this may enable a device (for example, the base station 110 or the encoder device 805) that does not receive the feedback directly from the one or more UEs 120 to remove a TB or a packet from the buffer when the TB or the packet has been successfully decoded or recovered by all intended recipients, thereby conserving memory resources of the device that would have otherwise been used to continue to store the TB or the packet in the buffer.

For example, in an eighth operation 845, the base station 110 may transmit, and the encoder device 805 may receive, an indication to remove one or more TBs, from the set of TBs, from the buffer of the encoder device based at least in part on the base station 110 receiving ACK messages associated with the one or more TBs. In other words, when the one or more UEs 120 transmit feedback for the network coded sidelink retransmission to the base station 110, the base station 110 may transmit an indication to the encoder device 805 to remove TBs or packets, from the buffer of the encoder device 805, that have been successfully decoded or recovered by all intended recipients of the TBs or the packets. For example, the base station 110 may identify, based at least in part on the feedback received from the one or more UEs, that all intended recipients of a TB, from the set of TBs associated with the network coded sidelink retransmission, have successfully decoded or recovered the TB (for example, based at least in part on received ACK feedback for the TB from all of the intended recipients). In response, the base station 110 may transmit, to the encoder device 805, an indication to remove the TB from the buffer of the encoder device 805. This may conserve memory resources of the encoder device 805 that would have otherwise been used to store the TB (for example, that is no longer needed for future retransmission).

In some other aspects, in a ninth operation 850, the encoder device 805 may transmit, and the base station 110 may receive, an indication to remove one or more TBs from a buffer of the base station 110. In other words, when the one or more UEs 120 transmit feedback for the network coded sidelink retransmission to the encoder device 805, the encoder device 805 may transmit an indication to the base station 110 to remove TBs or packets, from the buffer of the base station 110, that have been successfully decoded or recovered by all intended recipients of the TBs or the packets. For example, the encoder device 805 may receive ACK messages, from the one or more UEs 120, associated with the one or more TBs from the set of TBs. The encoder device 805 may identify, based at least in part on the feedback received from the one or more UEs, that all intended recipients of a TB, from the set of TBs associated with the network coded sidelink retransmission, have successfully decoded or recovered the TB (for example, based at least in part on received ACK feedback for the TB from all of the intended recipients). In response, the encoder device 805 may transmit, to the base station 110, an indication to remove the TB from the buffer of the base station 110. This may conserve memory resources of the base station 110 that would have otherwise been used to store the TB (for example, that is no longer needed for future retransmission).

The indications to remove the one or more TBs from a buffer (for example, transmitted by the base station 110 in the eighth operation 845 or by the encoder device 805 in the ninth operation 850) may include identifying information for the one or more TBs. For example, the indications to remove the one or more TBs from a buffer may include, for each TB, an indication of a source identifier of the TB, a packet identifier of the TB, or one or more identifiers of receivers associated with the ACK messages (for example, the identifiers of the UEs that provided ACK feedback for the TB), among other examples. The identifying information may enable the base station 110 or the encoder device 805 to identify the TBs to be removed from the buffer. In some aspects, the indications to remove the one or more TBs from a buffer (for example, transmitted by the base station 110 in the eighth operation 845 or by the encoder device 805 in the ninth operation 850) may be transmitted based at least in part on receiving ACK messages associated with a TB. For example, the transmission of the indication to remove a TB may be triggered by the device (for example, the base station 110 or the encoder device 805) receiving ACK feedback associated with the TB. Additionally or alternatively, the indications to remove the one or more TBs from a buffer (for example, transmitted by the base station 110 in the eighth operation 845 or by the encoder device 805 in the ninth operation 850) may be transmitted based at least in part on a periodic schedule. For example, the indications to remove the one or more TBs from a buffer may be transmitted periodically. The period associated with the periodic schedule may be signaled (for example, by the base station 110 or the encoder device) or may be pre-configured or defined (for example, by a wireless communication standard, such as the 3GPP).

Figure 9:
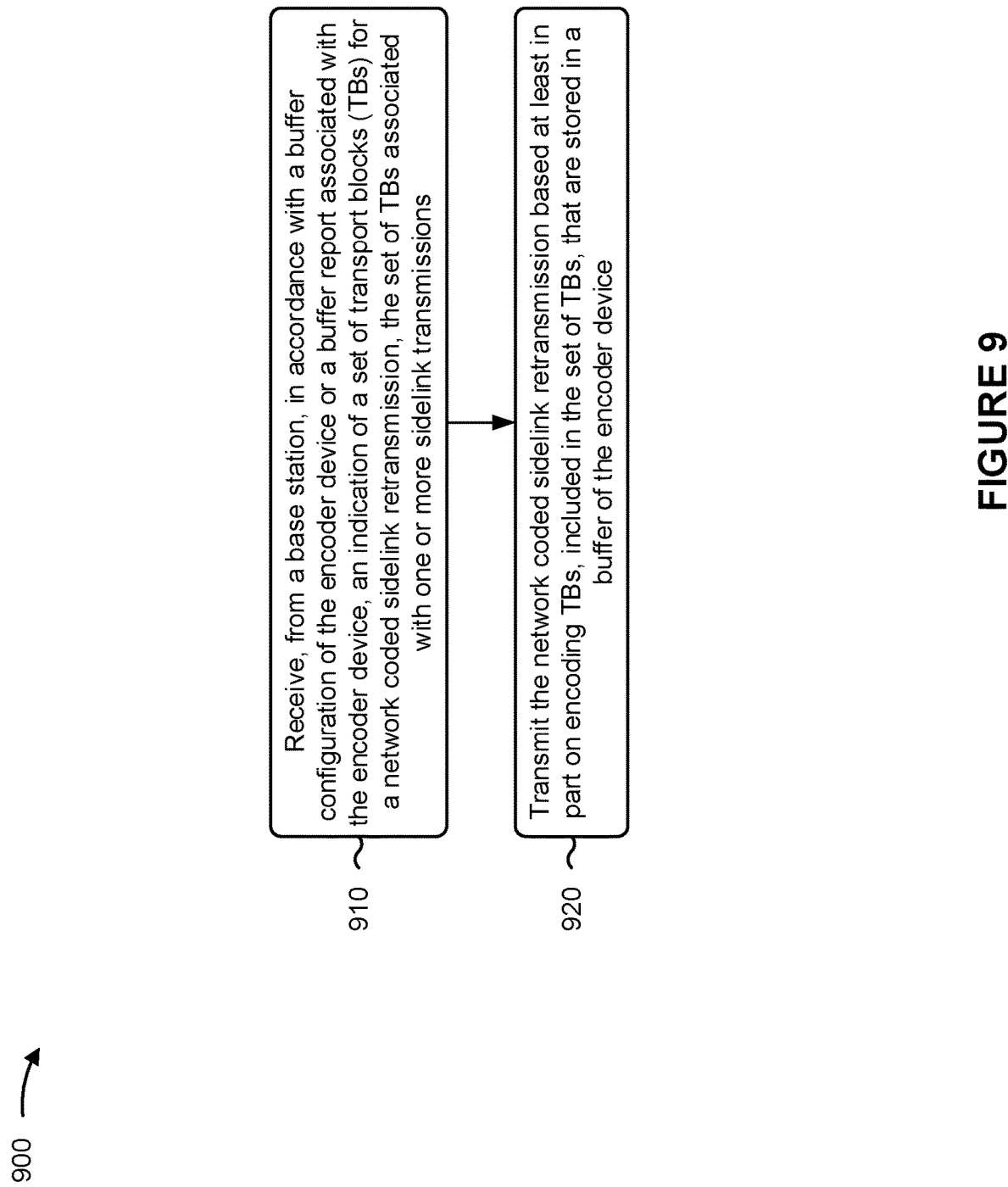
FIG. 9 is a flowchart illustrating an example process performed, for example, by an encoder device, associated with signaling for network coded sidelink retransmissions, in accordance with the present disclosure.

FIG. 9 is a flowchart illustrating an example process 900 performed, for example, by an encoder device in accordance with the present disclosure. Example process 900 is an example where the encoder device (for example, encoder device 805, a UE 120, an RSU 150, or a base station 110) performs operations associated with signaling for network coded sidelink retransmissions.

As shown in FIG. 9, in some aspects, process 900 may include receiving, from a base station, in accordance with a buffer configuration of the encoder device or a buffer report associated with the encoder device, an indication of a set of TBs for a network coded sidelink retransmission, the set of TBs associated with one or more sidelink transmissions (block 910). For example, the encoder device (such as by using communication manager 160 or reception component 1102, depicted in FIG. 11) may receive, from a base station, in accordance with a buffer configuration of the encoder device or a buffer report associated with the encoder device, an indication of a set of TBs for a network coded sidelink retransmission, the set of TBs associated with one or more sidelink transmissions, as described above.

As further shown in FIG. 9, in some aspects, process 900 may include transmitting the network coded sidelink retransmission based at least in part on encoding TBs, included in the set of TBs, that are stored in a buffer of the encoder device (block 920). For example, the encoder device (such as by using communication manager 160 or transmission component 1104, depicted in FIG. 11) may transmit the network coded sidelink retransmission based at least in part on encoding TBs, included in the set of TBs, that are stored in a buffer of the encoder device, as described above.

Process 900 may include additional aspects, such as any single aspect or any combination of aspects described below or in connection with one or more other processes described elsewhere herein.

In a first additional aspect, receiving the indication of the set of TBs includes receiving, for each TB included in the set of TBs, an indication of at least one of a source identifier, or a packet identifier.

In a second additional aspect, alone or in combination with the first aspect, the indication of the set of TBs is included in a PDCCH message.

In a third additional aspect, alone or in combination with one or more of the first and second aspects, the indication of the set of TBs is included in a unicast message associated with the encoder device.

In a fourth additional aspect, alone or in combination with one or more of the first through third aspects, the indication of the set of TBs is included in a multicast message associated with multiple encoder devices including the encoder device.

In a fifth additional aspect, alone or in combination with one or more of the first through fourth aspects, process 900 includes receiving an indication of one or more uplink control channel resources that are to be used for providing feedback associated with the set of TBs.

In a sixth additional aspect, alone or in combination with one or more of the first through fifth aspects, the one or more uplink control channel resources include an uplink control channel resource associated with providing an indication of whether the set of TBs are stored in the buffer of the encoder device.

In a seventh additional aspect, alone or in combination with one or more of the first through sixth aspects, the one or more uplink control channel resources include an uplink control channel resource associated with providing feedback indicating whether the network coded sidelink retransmission is successfully decoded by one or more receivers.

In an eighth additional aspect, alone or in combination with one or more of the first through seventh aspects, process 900 includes transmitting, to the base station using the one or more uplink control channel resources, the feedback associated with the set of TBs.

In a ninth additional aspect, alone or in combination with one or more of the first through eighth aspects, transmitting the network coded sidelink retransmission is further based at least in part on the set of TBs being included in the buffer of the encoder device.

In a tenth additional aspect, alone or in combination with one or more of the first through ninth aspects, one or more TBs, from the set of TBs, are not included in the buffer of the encoder device, and transmitting the network coded sidelink retransmission includes transmitting the network coded sidelink retransmission based at least in part on encoding TBs, from the set of TBs, that are included in the buffer.

In an eleventh additional aspect, alone or in combination with one or more of the first through tenth aspects, an action to be performed based at least in part on one or more TBs, from the set of TBs, not being included in the buffer of the encoder device is configured by the base station or defined, and the action includes refraining from transmitting the network coded sidelink retransmission, or transmitting the network coded sidelink retransmission without including the one or more TBs in the network coded sidelink retransmission.

In a twelfth additional aspect, alone or in combination with one or more of the first through eleventh aspects, process 900 includes receiving, from the base station, an indication to remove one or more TBs, from the set of TBs, from the buffer of the encoder device based at least in part on the base station receiving acknowledgement (ACK) messages associated with the one or more TBs.

In a thirteenth additional aspect, alone or in combination with one or more of the first through twelfth aspects, the indication to remove the one or more TBs includes, for a TB of the one or more TBs, at least one of a source identifier of the TB, a packet identifier of the TB, or one or more identifiers of receivers associated with the ACK messages.

In a fourteenth additional aspect, alone or in combination with one or more of the first through thirteenth aspects, process 900 includes receiving ACK messages associated with one or more TBs from the set of TBs, and transmitting, to the base station, an indication to remove the one or more TBs from a buffer of the base station, and the indication includes, for a TB of the one or more TBs, at least one of a source identifier of the TB, a packet identifier of the TB, or one or more identifiers of receivers associated with the ACK messages.

In a fifteenth additional aspect, alone or in combination with one or more of the first through fourteenth aspects, transmitting the indication to remove the one or more TBs from the buffer of the base station is based at least in part on receiving the ACK messages or based at least in part on a periodic schedule.

In a sixteenth additional aspect, alone or in combination with one or more of the first through fifteenth aspects, process 900 includes receiving, from the base station, the buffer configuration.

In a seventeenth additional aspect, alone or in combination with one or more of the first through sixteenth aspects, the buffer configuration is included in a unicast message associated with the encoder device.

In an eighteenth additional aspect, alone or in combination with one or more of the first through seventeenth aspects, the buffer configuration is included in a multicast message associated with multiple encoder devices including the encoder device.

In a nineteenth additional aspect, alone or in combination with one or more of the first through eighteenth aspects, the buffer configuration indicates a type of TB that is to be buffered by the encoder device.

In a twentieth additional aspect, alone or in combination with one or more of the first through nineteenth aspects, TBs that are to be buffered by the encoder device are based at least in part on one or more parameters indicated by the buffer configuration.

In a twenty-first additional aspect, alone or in combination with one or more of the first through twentieth aspects, the one or more parameters include at least one of a time window associated with an initial transmission time of the TBs that are to be buffered by the encoder device, a remaining PDB of the TBs that are to be buffered by the encoder device, one or more source identifiers of the TBs that are to be buffered by the encoder device, one or more destination identifiers of the TBs that are to be buffered by the encoder device, a threshold quantity of retransmissions to be associated with the TBs that are to be buffered by the encoder device, a priority threshold for a priority of the TBs that are to be buffered by the encoder device, or location information of the TBs that are to be buffered by the encoder device.

In a twenty-second additional aspect, alone or in combination with one or more of the first through twenty-first aspects, process 900 includes transmitting, to the base station, the buffer report, and the buffer report includes an indication of TBs that are included in the buffer of the encoder device.

In a twenty-third additional aspect, alone or in combination with one or more of the first through twenty-second aspects, the buffer report is included in an uplink control channel message.

In a twenty-fourth additional aspect, alone or in combination with one or more of the first through twenty-third aspects, transmitting the buffer report is based at least in part on a TB being added to the buffer or based at least in part on a periodic schedule.

In a twenty-fifth additional aspect, alone or in combination with one or more of the first through twenty-fourth aspects, the buffer report includes, for each TB included in the buffer of the encoder device, an indication of at least one of a source identifier associated with the TB, or an identifier associated with the TB.

In a twenty-sixth additional aspect, alone or in combination with one or more of the first through twenty-fifth aspects, the buffer report includes an indication of all TBs included in the buffer of the encoder device.

In a twenty-seventh additional aspect, alone or in combination with one or more of the first through twenty-sixth aspects, the buffer report includes an indication of TBs that have been added or removed from the buffer of the encoder device relative to a previous buffer report.

Although FIG. 9 shows example blocks of process 900, in some aspects, process 900 may include additional blocks, fewer blocks, different blocks, or differently arranged blocks than those depicted in FIG. 9. Additionally or alternatively, two or more of the blocks of process 900 may be performed in parallel.

Figure 10:
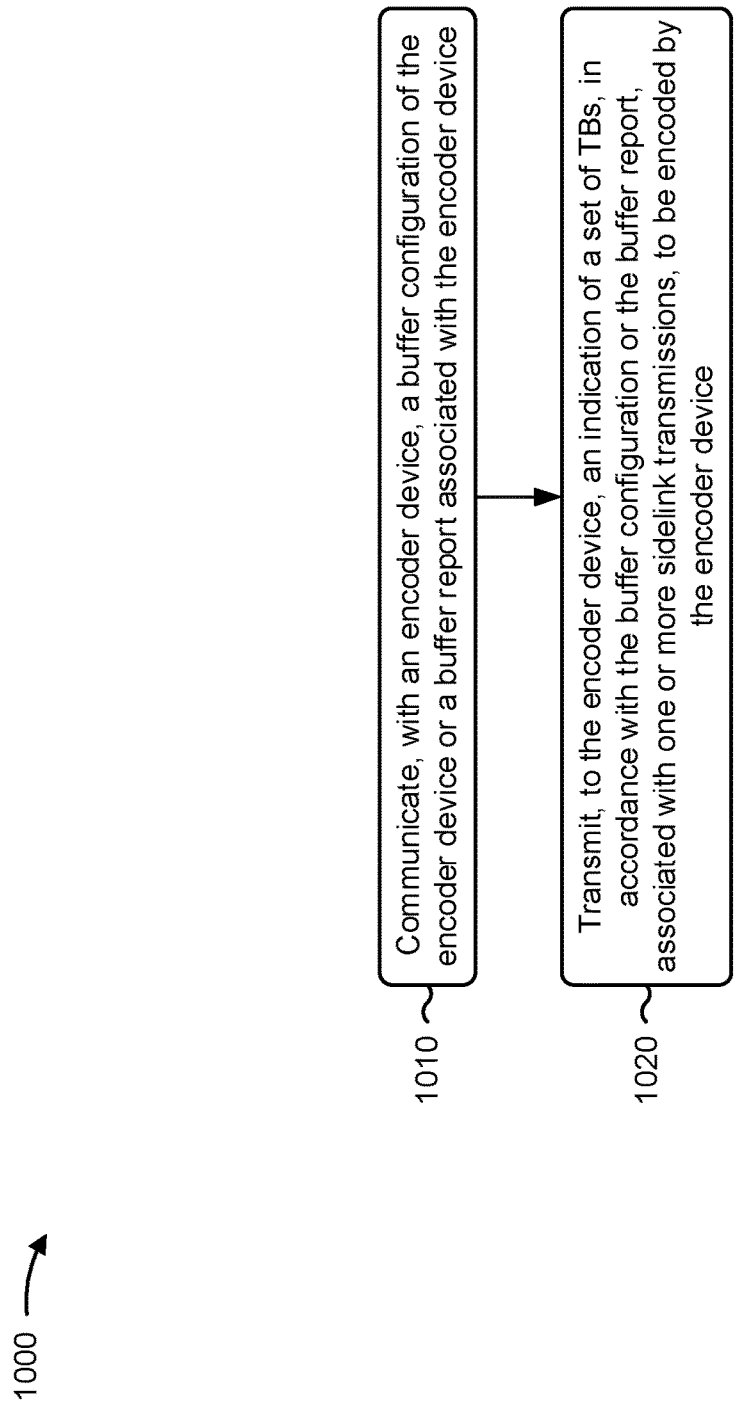
FIG. 10 is a flowchart illustrating an example process performed, for example, by a base station, associated with signaling for network coded sidelink retransmissions, in accordance with the present disclosure.

FIG. 10 is a flowchart illustrating an example process 1000 performed, for example, by a base station in accordance with the present disclosure. Example process 1000 is an example where the base station (for example, base station 110) performs operations associated with signaling for network coded sidelink retransmissions.

As shown in FIG. 10, in some aspects, process 1000 may include communicating, with an encoder device, a buffer configuration of the encoder device or a buffer report associated with the encoder device (block 1010). For example, the base station (such as by using communication manager 140, transmission component 1204 or reception component 1202, depicted in FIG. 12) may communicate, with an encoder device, a buffer configuration of the encoder device or a buffer report associated with the encoder device, as described above.

As further shown in FIG. 10, in some aspects, process 1000 may include transmitting, to the encoder device, an indication of a set of TBs, in accordance with the buffer configuration or the buffer report, associated with one or more sidelink transmissions, to be encoded by the encoder device (block 1020). For example, the base station (such as by using communication manager 140 or transmission component 1204, depicted in FIG. 12) may transmit, to the encoder device, an indication of a set of TBs, in accordance with the buffer configuration or the buffer report, associated with one or more sidelink transmissions, to be encoded by the encoder device, as described above.

Process 1000 may include additional aspects, such as any single aspect or any combination of aspects described below or in connection with one or more other processes described elsewhere herein.

In a first additional aspect, transmitting the indication of the set of TBs includes transmitting, for each TB included in the set of TBs, an indication of at least one of a source identifier, or a packet identifier.

In a second additional aspect, alone or in combination with the first aspect, the indication of the set of TBs is included in a PDCCH message.

In a third additional aspect, alone or in combination with one or more of the first and second aspects, the indication of the set of TBs is included in a unicast message associated with the encoder device.

In a fourth additional aspect, alone or in combination with one or more of the first through third aspects, the indication of the set of TBs is included in a multicast message associated with multiple encoder devices including the encoder device.

In a fifth additional aspect, alone or in combination with one or more of the first through fourth aspects, process 1000 includes transmitting an indication of one or more uplink control channel resources that are to be used for providing feedback associated with the set of TBs.

In a sixth additional aspect, alone or in combination with one or more of the first through fifth aspects, the one or more uplink control channel resources include an uplink control channel resource associated with providing an indication of whether the set of TBs are stored in a buffer of the encoder device.

In a seventh additional aspect, alone or in combination with one or more of the first through sixth aspects, the one or more uplink control channel resources include an uplink control channel resource associated with providing feedback indicating whether the network coded sidelink retransmission is successfully decoded by one or more receivers.

In an eighth additional aspect, alone or in combination with one or more of the first through seventh aspects, process 1000 includes receiving, from the encoder device using the one or more uplink control channel resources, the feedback associated with the set of TBs.

In a ninth additional aspect, alone or in combination with one or more of the first through eighth aspects, an action to be performed based at least in part on one or more TBs, from the set of TBs, not being included in a buffer of the encoder device is configured by the base station or defined, and the action includes the encoder device refraining from transmitting the network coded sidelink retransmission, or the encoder device transmitting the network coded sidelink retransmission without including the one or more TBs in the network coded sidelink retransmission.

In a tenth additional aspect, alone or in combination with one or more of the first through ninth aspects, process 1000 includes receiving ACK messages associated with one or more TBs from the set of TBs, and transmitting, to the encoder device, an indication to remove the one or more TBs, from the set of TBs, from a buffer of the encoder device based at least in part on the base station receiving the ACK messages associated with the one or more TBs.

In an eleventh additional aspect, alone or in combination with one or more of the first through tenth aspects, the indication to remove the one or more TBs includes, for a TB of the one or more TBs, at least one of a source identifier of the TB, a packet identifier of the TB, or one or more identifiers of receivers associated with the ACK messages.

In a twelfth additional aspect, alone or in combination with one or more of the first through eleventh aspects, transmitting the indication to remove the one or more TBs from the buffer of the base station is based at least in part on receiving the ACK messages or based at least in part on a periodic schedule.

In a thirteenth additional aspect, alone or in combination with one or more of the first through twelfth aspects, process 1000 includes receiving, from the encoder device, an indication to remove one or more TBs from a buffer of the base station.

In a fourteenth additional aspect, alone or in combination with one or more of the first through thirteenth aspects, communicating the buffer configuration or the buffer report includes transmitting, to the encoder device, the buffer configuration.

In a fifteenth additional aspect, alone or in combination with one or more of the first through fourteenth aspects, the buffer configuration is included in a unicast message associated with the encoder device.

In a sixteenth additional aspect, alone or in combination with one or more of the first through fifteenth aspects, the buffer configuration is included in a multicast message associated with multiple encoder devices including the encoder device.

In a seventeenth additional aspect, alone or in combination with one or more of the first through sixteenth aspects, the buffer configuration indicates a type of TB that is to be buffered by the encoder device.

In an eighteenth additional aspect, alone or in combination with one or more of the first through seventeenth aspects, TBs that are to be buffered by the encoder device are based at least in part on one or more parameters indicated by the buffer configuration.

In a nineteenth additional aspect, alone or in combination with one or more of the first through eighteenth aspects, the one or more parameters include at least one of a time window associated with an initial transmission time of the TBs that are to be buffered by the encoder device, a remaining PDB of the TBs that are to be buffered by the encoder device, one or more source identifiers of the TBs that are to be buffered by the encoder device, one or more destination identifiers of the TBs that are to be buffered by the encoder device, a threshold quantity of retransmissions to be associated with the TBs that are to be buffered by the encoder device, a priority threshold for a priority of the TBs that are to be buffered by the encoder device, or location information of the TBs that are to be buffered by the encoder device.

In a twentieth additional aspect, alone or in combination with one or more of the first through nineteenth aspects, communicating the buffer configuration or the buffer report includes receiving, from the encoder device, the buffer report, and the buffer report includes an indication of TBs that are included in a buffer of the encoder device.

In a twenty-first additional aspect, alone or in combination with one or more of the first through twentieth aspects, the buffer report is included in an uplink control channel message.

In a twenty-second additional aspect, alone or in combination with one or more of the first through twenty-first aspects, transmitting the buffer report is based at least in part on a TB being added to the buffer or based at least in part on a periodic schedule.

In a twenty-third additional aspect, alone or in combination with one or more of the first through twenty-second aspects, the buffer report includes, for each TB included in a buffer of the encoder device, an indication of at least one of a source identifier associated with the TB, or a packet identifier associated with the TB.

In a twenty-fourth additional aspect, alone or in combination with one or more of the first through twenty-third aspects, the buffer report includes an indication of all TBs included in a buffer of the encoder device.

In a twenty-fifth additional aspect, alone or in combination with one or more of the first through twenty-fourth aspects, the buffer report includes an indication of TBs that have been added or removed from a buffer of the encoder device relative to a previous buffer report.

Although FIG. 10 shows example blocks of process 1000, in some aspects, process 1000 may include additional blocks, fewer blocks, different blocks, or differently arranged blocks than those depicted in FIG. 10. Additionally or alternatively, two or more of the blocks of process 1000 may be performed in parallel.

Figure 11:
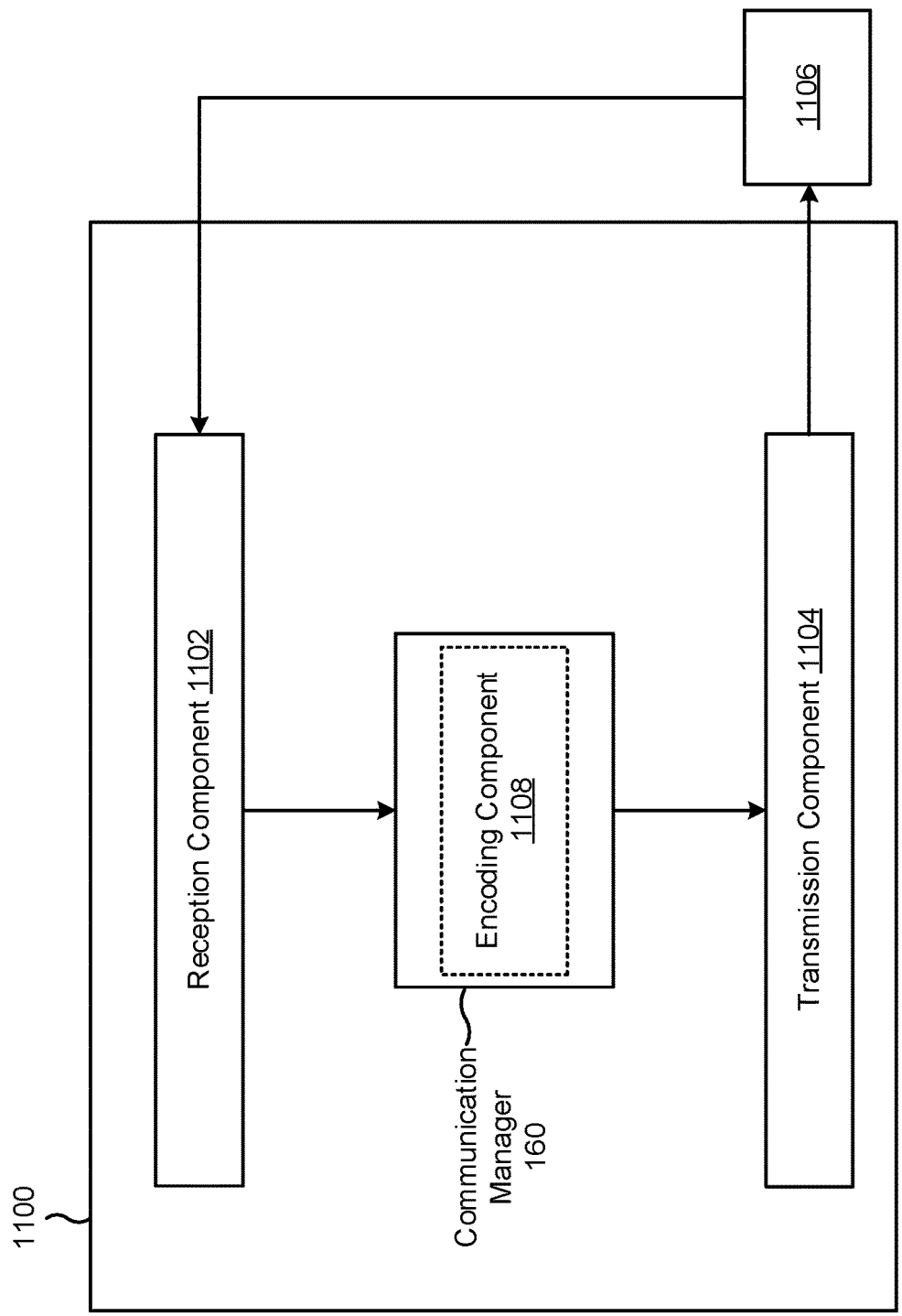
FIGS. 11 and 12 are diagrams of example apparatuses for wireless communication in accordance with the present disclosure.

FIG. 11 is a diagram of an example apparatus 1100 for wireless communication in accordance with the present disclosure. The apparatus 1100 may be an encoder device, or an encoder device may include the apparatus 1100. The encoder device may be a UE, an RSU, a base station, or another device. In some aspects, the apparatus 1100 includes a reception component 1102, a transmission component 1104, and a communication manager 160, which may be in communication with one another (for example, via one or more buses). As shown, the apparatus 1100 may communicate with another apparatus 1106 (such as a UE, a base station, or another wireless communication device) using the reception component 1102 and the transmission component 1104.

In some aspects, the apparatus 1100 may be configured to perform one or more operations described herein in connection with FIG. 8. Additionally or alternatively, the apparatus 1100 may be configured to perform one or more processes described herein, such as process 900 of FIG. 9, or a combination thereof. In some aspects, the apparatus 1100 may include one or more components of the encoder device described above in connection with FIG. 2.

The reception component 1102 may receive communications, such as reference signals, control information, data communications, or a combination thereof, from the apparatus 1106. The reception component 1102 may provide received communications to one or more other components of the apparatus 1100, such as the communication manager 160. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components. In some aspects, the reception component 1102 may include one or more antennas, a modem, a demodulator, a MIMO detector, a receive processor, a controller/processor, a memory, or a combination thereof, of the encoder device, UE, RSU, or base station described above in connection with FIG. 2.

The transmission component 1104 may transmit communications, such as reference signals, control information, data communications, or a combination thereof, to the apparatus 1106. In some aspects, the communication manager 160 may generate communications and may transmit the generated communications to the transmission component 1104 for transmission to the apparatus 1106. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1106. In some aspects, the transmission component 1104 may include one or more antennas, a modem, a modulator, a transmit MIMO processor, a transmit processor, a controller/processor, a memory, or a combination thereof, of the encoder device, UE, RSU, or base station described above in connection with FIG. 2. In some aspects, the transmission component 1104 may be co-located with the reception component 1102 in a transceiver.

The communication manager 160 may receive or may cause the reception component 1102 to receive, from a base station, an indication of a set of TBs, in accordance with a buffer configuration of the encoder device or a buffer report associated with the encoder device, for a network coded sidelink retransmission, the set of TBs associated with one or more sidelink transmissions. The communication manager 160 may transmit or may cause the transmission component 1104 to transmit the network coded sidelink retransmission based at least in part on encoding TBs, included in the set of TBs, that are stored in a buffer of the encoder device to generate the network coded sidelink retransmission. In some aspects, the communication manager 160 may perform one or more operations described elsewhere herein as being performed by one or more components of the communication manager 160.

The communication manager 160 may include a controller/processor, a memory, or a combination thereof, of the encoder device described above in connection with FIG. 2. In some aspects, the communication manager 160 includes a set of components, such as an encoding component 1108, or a combination thereof. Alternatively, the set of components may be separate and distinct from the communication manager 160. In some aspects, one or more components of the set of components may include or may be implemented within a controller/processor, a memory, or a combination thereof, of the encoder device described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive, from a base station, in accordance with a buffer configuration of the encoder device or a buffer report associated with the encoder device, an indication of a set of TBs for a network coded sidelink retransmission, the set of TBs associated with one or more sidelink transmissions. The transmission component 1104 may transmit the network coded sidelink retransmission based at least in part on encoding TBs, included in the set of TBs, that are stored in a buffer of the encoder device.

The encoding component 1108 may encode the TBs, included in the set of TBs, that are stored in a buffer of the encoder device to generate the network coded sidelink retransmission.

The reception component 1102 may receive an indication of one or more uplink control channel resources that are to be used for providing feedback associated with the set of TBs.

The transmission component 1104 may transmit, to the base station using the one or more uplink control channel resources, the feedback associated with the set of TBs.

The reception component 1102 may receive, from the base station, an indication to remove one or more TBs, from the set of TBs, from the buffer of the encoder device based at least in part on the base station receiving ACK messages associated with the one or more TBs.

The reception component 1102 may receive ACK messages associated with one or more TBs from the set of TBs.

The transmission component 1104 may transmit, to the base station, an indication to remove the one or more TBs from a buffer of the base station, wherein the indication includes, for a TB of the one or more TBs, at least one of a source identifier of the TB, a packet identifier of the TB, or one or more identifiers of receivers associated with the ACK messages.

The reception component 1102 may receive, from the base station, the buffer configuration.

The transmission component 1104 may transmit, to the base station, the buffer report, wherein the buffer report includes an indication of TBs that are included in the buffer of the encoder device.

The quantity and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally or alternatively, a set of (one or more) components shown in FIG. 11 may perform one or more functions described as being performed by another set of components shown in FIG. 11.

Figure 12:
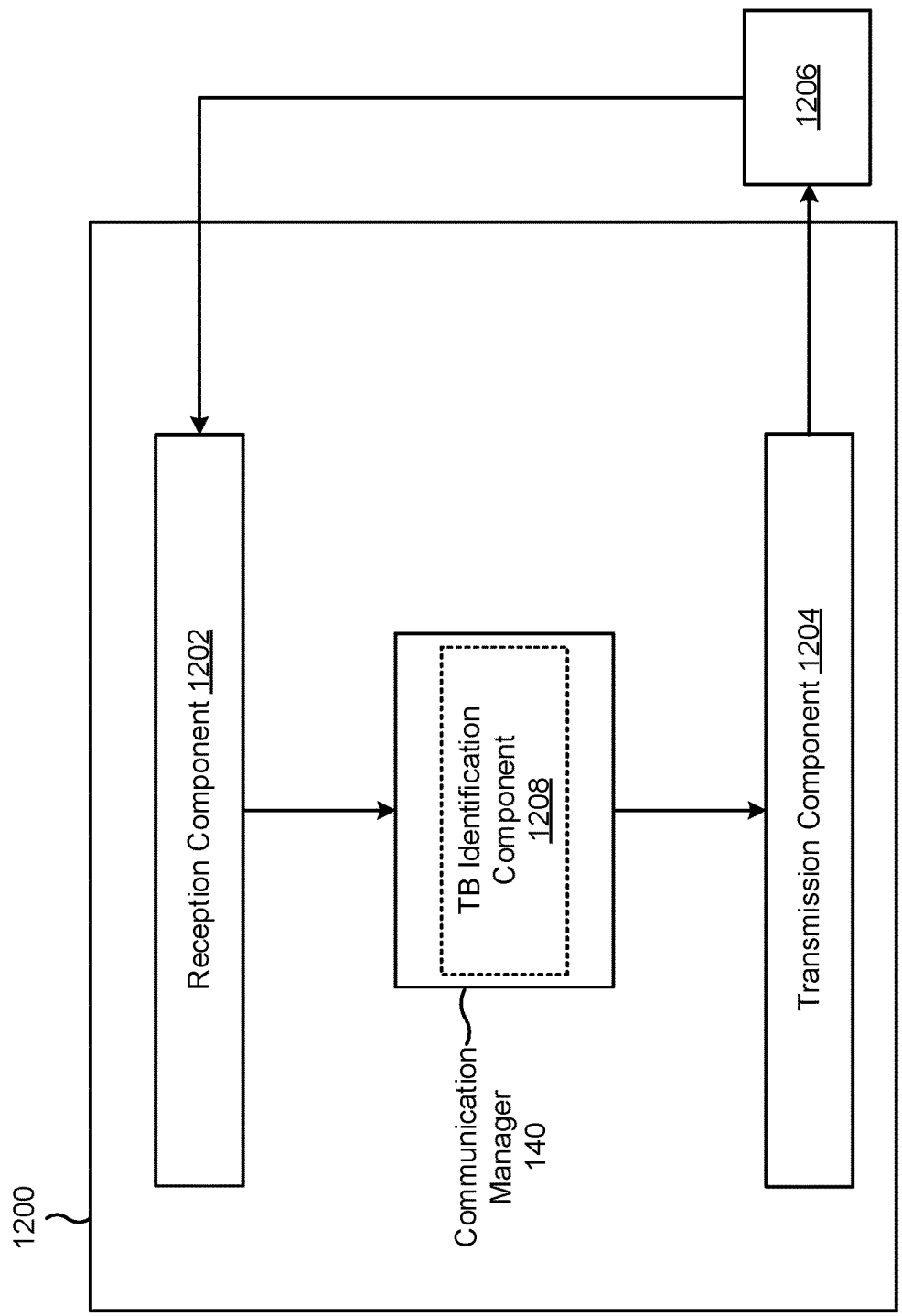

FIG. 12 is a diagram of an example apparatus 1200 for wireless communication in accordance with the present disclosure. The apparatus 1200 may be a base station, or a base station may include the apparatus 1200. In some aspects, the apparatus 1200 includes a reception component 1202, a transmission component 1204, and a communication manager 140, which may be in communication with one another (for example, via one or more buses). As shown, the apparatus 1200 may communicate with another apparatus 1206 (such as a UE, a base station, or another wireless communication device) using the reception component 1202 and the transmission component 1204.

In some aspects, the apparatus 1200 may be configured to perform one or more operations described herein in connection with FIG. 8. Additionally or alternatively, the apparatus 1200 may be configured to perform one or more processes described herein, such as process 1000 of FIG. 10, or a combination thereof. In some aspects, the apparatus 1200 may include one or more components of the base station described above in connection with FIG. 2.

The reception component 1202 may receive communications, such as reference signals, control information, data communications, or a combination thereof, from the apparatus 1206. The reception component 1202 may provide received communications to one or more other components of the apparatus 1200, such as the communication manager 140. In some aspects, the reception component 1202 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components. In some aspects, the reception component 1202 may include one or more antennas, a modem, a demodulator, a MIMO detector, a receive processor, a controller/processor, a memory, or a combination thereof, of the base station described above in connection with FIG. 2.

The transmission component 1204 may transmit communications, such as reference signals, control information, data communications, or a combination thereof, to the apparatus 1206. In some aspects, the communication manager 140 may generate communications and may transmit the generated communications to the transmission component 1204 for transmission to the apparatus 1206. In some aspects, the transmission component 1204 may perform signal processing on the generated communications (such as filtering, amplification, modulation, digital-to-analog conversion, multiplexing, interleaving, mapping, or encoding, among other examples), and may transmit the processed signals to the apparatus 1206. In some aspects, the transmission component 1204 may include one or more antennas, a modem, a modulator, a transmit MIMO processor, a transmit processor, a controller/processor, a memory, or a combination thereof, of the base station described above in connection with FIG. 2. In some aspects, the transmission component 1204 may be co-located with the reception component 1202 in a transceiver.

The communication manager 140 may communicate, with an encoder device, a buffer configuration of the encoder device or a buffer report associated with the encoder device. The communication manager 140 may transmit or may cause the transmission component 1204 to transmit, to the encoder device, an indication of a set of TBs, in accordance with the buffer configuration or the buffer report, associated with one or more sidelink transmissions, to be encoded by the encoder device. In some aspects, the communication manager 140 may perform one or more operations described elsewhere herein as being performed by one or more components of the communication manager 140.

The communication manager 140 may include a controller/processor, a memory, a scheduler, a communication unit, or a combination thereof, of the base station described above in connection with FIG. 2. In some aspects, the communication manager 140 includes a set of components, such as a TB identification component 1208, or a combination thereof. Alternatively, the set of components may be separate and distinct from the communication manager 140. In some aspects, one or more components of the set of components may include or may be implemented within a controller/processor, a memory, a scheduler, a communication unit, or a combination thereof, of the base station described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1202 or the transmission component 1204 may communicate, with an encoder device, a buffer configuration of the encoder device or a buffer report associated with the encoder device. The transmission component 1204 may transmit, to the encoder device, an indication of a set of TBs, in accordance with the buffer configuration or the buffer report, associated with one or more sidelink transmissions, to be encoded by the encoder device.

The TB identification component 1208 may identify the set of TBs, in accordance with the buffer configuration or the buffer report, for the network coded sidelink retransmission.

The transmission component 1204 may transmit an indication of one or more uplink control channel resources that are to be used for providing feedback associated with the set of TBs.

The reception component 1202 may receive, from the encoder device using the one or more uplink control channel resources, the feedback associated with the set of TBs.

The reception component 1202 may receive acknowledgement (ACK) messages associated with one or more TBs from the set of TBs.

The transmission component 1204 may transmit, to the encoder device, an indication to remove the one or more TBs, from the set of TBs, from a buffer of the encoder device based at least in part on the base station receiving the ACK messages associated with the one or more TBs.

The reception component 1202 may receive, from the encoder device, an indication to remove one or more TBs from a buffer of the base station.

The quantity and arrangement of components shown in FIG. 12 are provided as an example. In practice, there may be additional components, fewer components, different components, or differently arranged components than those shown in FIG. 12. Furthermore, two or more components shown in FIG. 12 may be implemented within a single component, or a single component shown in FIG. 12 may be implemented as multiple, distributed components. Additionally or alternatively, a set of (one or more) components shown in FIG. 12 may perform one or more functions described as being performed by another set of components shown in FIG. 12.

The following provides an overview of some Aspects of the present disclosure:

Aspect 1: A method of wireless communication performed by an encoder device, comprising: receiving, from a base station, in accordance with a buffer configuration of the encoder device or a buffer report associated with the encoder device, an indication of a set of transport blocks (TBs) for a network coded sidelink retransmission, the set of TBs associated with one or more sidelink transmissions; and transmitting the network coded sidelink retransmission based at least in part on encoding TBs, included in the set of TBs, that are stored in a buffer of the encoder device.

Aspect 2: The method of Aspect 1, wherein receiving the indication of the set of TBs comprises receiving, for each TB included in the set of TBs, an indication of at least one of: a source identifier, or a packet identifier.

Aspect 3: The method of any of Aspects 1-2, wherein the indication of the set of TBs is included in a physical downlink control channel (PDCCH) message.

Aspect 4: The method of any of Aspects 1-3, wherein the indication of the set of TBs is included in a unicast message associated with the encoder device.

Aspect 5: The method of any of Aspects 1-3, wherein the indication of the set of TBs is included in a multicast message associated with multiple encoder devices including the encoder device.

Aspect 6: The method of any of Aspects 1-5, further comprising receiving an indication of one or more uplink control channel resources that are to be used for providing feedback associated with the set of TBs.

Aspect 7: The method of Aspect 6, wherein the one or more uplink control channel resources include an uplink control channel resource associated with providing an indication of whether the set of TBs are stored in the buffer of the encoder device.

Aspect 8: The method of any of Aspects 6-7, wherein the one or more uplink control channel resources include an uplink control channel resource associated with providing feedback indicating whether the network coded sidelink retransmission is successfully decoded by one or more receivers.

Aspect 9: The method of any of Aspects 6-8, further comprising transmitting, to the base station using the one or more uplink control channel resources, the feedback associated with the set of TBs.

Aspect 10: The method of any of Aspects 1-9, wherein transmitting the network coded sidelink retransmission is further based at least in part on the set of TBs being included in the buffer of the encoder device.

Aspect 11: The method of any of Aspects 1-10, wherein one or more TBs, from the set of TBs, are not included in the buffer of the encoder device, and wherein transmitting the network coded sidelink retransmission comprises transmitting the network coded sidelink retransmission based at least in part on encoding TBs, from the set of TBs, that are included in the buffer.

Aspect 12: The method of any of Aspects 1-11, wherein an action to be performed based at least in part on one or more TBs, from the set of TBs, not being included in the buffer of the encoder device is configured by the base station or defined, wherein the action includes: refraining from transmitting the network coded sidelink retransmission; or transmitting the network coded sidelink retransmission without including the one or more TBs in the network coded sidelink retransmission.

Aspect 13: The method of any of Aspects 1-12, further comprising receiving, from the base station, an indication to remove one or more TBs, from the set of TBs, from the buffer of the encoder device based at least in part on the base station receiving acknowledgement (ACK) messages associated with the one or more TBs.

Aspect 14: The method of Aspect 13, wherein the indication to remove the one or more TBs includes, for a TB of the one or more TBs, at least one of: a source identifier of the TB, a packet identifier of the TB, or one or more identifiers of receivers associated with the ACK messages.

Aspect 15: The method of any of Aspects 1-14, further comprising: receiving acknowledgement (ACK) messages associated with one or more TBs from the set of TBs; and transmitting, to the base station, an indication to remove the one or more TBs from a buffer of the base station, wherein the indication includes, for a TB of the one or more TBs, at least one of: a source identifier of the TB, a packet identifier of the TB, or one or more identifiers of receivers associated with the ACK messages.

Aspect 16: The method of Aspect 15, wherein transmitting the indication to remove the one or more TBs from the buffer of the base station is based at least in part on receiving the ACK messages or based at least in part on a periodic schedule.

Aspect 17: The method of any of Aspects 1-17, further comprising receiving, from the base station, the buffer configuration.

Aspect 18: The method of Aspect 17, wherein the buffer configuration is included in a unicast message associated with the encoder device.

Aspect 19: The method of Aspect 17, wherein the buffer configuration is included in a multicast message associated with multiple encoder devices including the encoder device.

Aspect 20: The method of any of Aspects 1-19, wherein the buffer configuration indicates a type of TB that is to be buffered by the encoder device.

Aspect 21: The method of any of Aspects 1-20, wherein TBs that are to be buffered by the encoder device are based at least in part on one or more parameters indicated by the buffer configuration.

Aspect 22: The method of Aspect 21, wherein the one or more parameters include at least one of: a time window associated with an initial transmission time of the TBs that are to be buffered by the encoder device, a remaining packet delay budget (PDB) of the TBs that are to be buffered by the encoder device, one or more source identifiers of the TBs that are to be buffered by the encoder device, one or more destination identifiers of the TBs that are to be buffered by the encoder device, a threshold quantity of retransmissions to be associated with the TBs that are to be buffered by the encoder device, a priority threshold for a priority of the TBs that are to be buffered by the encoder device, or location information of the TBs that are to be buffered by the encoder device.

Aspect 23: The method of any of Aspects 1-23, further comprising transmitting, to the base station, the buffer report, wherein the buffer report includes an indication of TBs that are included in the buffer of the encoder device.

Aspect 24: The method of Aspect 23, wherein the buffer report is included in an uplink control channel message.

Aspect 25: The method of any of Aspects 23-24, wherein transmitting the buffer report is based at least in part on a TB being added to the buffer or based at least in part on a periodic schedule.

Aspect 26: The method of any of Aspects 1-25, wherein the buffer report includes, for each TB included in the buffer of the encoder device, an indication of at least one of: a source identifier associated with the TB, or an identifier associated with the TB.

Aspect 27: The method of any of Aspects 1-26, wherein the buffer report includes an indication of all TBs included in the buffer of the encoder device.

Aspect 28: The method of any of Aspects 1-27, wherein the buffer report includes an indication of TBs that have been added or removed from the buffer of the encoder device relative to a previous buffer report.

Aspect 29: A method of wireless communication performed by a base station, comprising: communicating, with an encoder device, a buffer configuration of the encoder device or a buffer report associated with the encoder device; and transmitting, to the encoder device, an indication of a set of transport blocks (TBs), in accordance with the buffer configuration or the buffer report, associated with one or more sidelink transmissions, to be encoded by the encoder device.

Aspect 30: The method of Aspect 29, wherein transmitting the indication of the set of TBs comprises transmitting, for each TB included in the set of TBs, an indication of at least one of: a source identifier, or a packet identifier.

Aspect 31: The method of any of Aspects 29-30, wherein the indication of the set of TBs is included in a physical downlink control channel (PDCCH) message.

Aspect 32: The method of any of Aspects 29-31, wherein the indication of the set of TBs is included in a unicast message associated with the encoder device.

Aspect 33: The method of any of Aspects 29-31, wherein the indication of the set of TBs is included in a multicast message associated with multiple encoder devices including the encoder device.

Aspect 34: The method of any of Aspects 29-33, further comprising transmitting an indication of one or more uplink control channel resources that are to be used for providing feedback associated with the set of TBs.

Aspect 35: The method of Aspect 34, wherein the one or more uplink control channel resources include an uplink control channel resource associated with providing an indication of whether the set of TBs are stored in a buffer of the encoder device.

Aspect 36: The method of any of Aspects 34-35, wherein the one or more uplink control channel resources include an uplink control channel resource associated with providing feedback indicating whether the network coded sidelink retransmission is successfully decoded by one or more receivers.

Aspect 37: The method of any of Aspects 34-36, further comprising receiving, from the encoder device using the one or more uplink control channel resources, the feedback associated with the set of TBs.

Aspect 38: The method of any of Aspects 29-37, wherein an action to be performed based at least in part on one or more TBs, from the set of TBs, not being included in a buffer of the encoder device is configured by the base station or defined, and wherein the action includes: the encoder device refraining from transmitting the network coded sidelink retransmission; or the encoder device transmitting the network coded sidelink retransmission without including the one or more TBs in the network coded sidelink retransmission.

Aspect 39: The method of any of Aspects 29-38, further comprising: receiving acknowledgement (ACK) messages associated with one or more TBs from the set of TBs; and transmitting, to the encoder device, an indication to remove the one or more TBs, from the set of TBs, from a buffer of the encoder device based at least in part on the base station receiving the ACK messages associated with the one or more TBs.

Aspect 40: The method of Aspect 39, wherein the indication to remove the one or more TBs includes, for a TB of the one or more TBs, at least one of: a source identifier of the TB, a packet identifier of the TB, or one or more identifiers of receivers associated with the ACK messages.

Aspect 41: The method of any of Aspects 39-40, wherein transmitting the indication to remove the one or more TBs from the buffer of the base station is based at least in part on receiving the ACK messages or based at least in part on a periodic schedule.

Aspect 42: The method of any of Aspects 29-41, further comprising receiving, from the encoder device, an indication to remove one or more TBs from a buffer of the base station.

Aspect 43: The method of any of Aspects 29-42, wherein communicating the buffer configuration or the buffer report comprises transmitting, to the encoder device, the buffer configuration.

Aspect 44: The method of Aspect 43, wherein the buffer configuration is included in a unicast message associated with the encoder device.

Aspect 45: The method of Aspect 43, wherein the buffer configuration is included in a multicast message associated with multiple encoder devices including the encoder device.

Aspect 46: The method of any of Aspects 29-45, wherein the buffer configuration indicates a type of TB that is to be buffered by the encoder device.

Aspect 47: The method of any of Aspects 29-46, wherein TBs that are to be buffered by the encoder device are based at least in part on one or more parameters indicated by the buffer configuration.

Aspect 48: The method of Aspect 47, wherein the one or more parameters include at least one of: a time window associated with an initial transmission time of the TBs that are to be buffered by the encoder device, a remaining packet delay budget (PDB) of the TBs that are to be buffered by the encoder device, one or more source identifiers of the TBs that are to be buffered by the encoder device, one or more destination identifiers of the TBs that are to be buffered by the encoder device, a threshold quantity of retransmissions to be associated with the TBs that are to be buffered by the encoder device, a priority threshold for a priority of the TBs that are to be buffered by the encoder device, or location information of the TBs that are to be buffered by the encoder device.

Aspect 49: The method of any of Aspects 29-48, wherein communicating the buffer configuration or the buffer report comprises receiving, from the encoder device, the buffer report, and wherein the buffer report includes an indication of TBs that are included in a buffer of the encoder device.

Aspect 50: The method of Aspect 49, wherein the buffer report is included in an uplink control channel message.

Aspect 51: The method of any of Aspects 49-50, wherein transmitting the buffer report is based at least in part on a TB being added to the buffer or based at least in part on a periodic schedule.

Aspect 52: The method of any of Aspects 29-51, wherein the buffer report includes, for each TB included in a buffer of the encoder device, an indication of at least one of: a source identifier associated with the TB, or a packet identifier associated with the TB.

Aspect 53: The method of any of Aspects 29-52, wherein the buffer report includes an indication of all TBs included in a buffer of the encoder device.

Aspect 54: The method of any of Aspects 29-53, wherein the buffer report includes an indication of TBs that have been added or removed from a buffer of the encoder device relative to a previous buffer report.

Aspect 55: An apparatus for wireless communication at a device, comprising a processor; memory coupled with the processor; and instructions stored in the memory and executable by the processor to cause the apparatus to perform the method of one or more of Aspects 1-28.

Aspect 56: A device for wireless communication, comprising a memory and one or more processors coupled to the memory, the one or more processors configured to perform the method of one or more of Aspects 1-28.

Aspect 57: An apparatus for wireless communication, comprising at least one means for performing the method of one or more of Aspects 1-28.

Aspect 58: A non-transitory computer-readable medium storing code for wireless communication, the code comprising instructions executable by a processor to perform the method of one or more of Aspects 1-28.

Aspect 59: A non-transitory computer-readable medium storing a set of instructions for wireless communication, the set of instructions comprising one or more instructions that, when executed by one or more processors of a device, cause the device to perform the method of one or more of Aspects 1-28.

Aspect 60: An apparatus for wireless communication at a device, comprising a processor; memory coupled with the processor; and instructions stored in the memory and executable by the processor to cause the apparatus to perform the method of one or more of Aspects 29-54.

Aspect 61: A device for wireless communication, comprising a memory and one or more processors coupled to the memory, the one or more processors configured to perform the method of one or more of Aspects 29-54.

Aspect 62: An apparatus for wireless communication, comprising at least one means for performing the method of one or more of Aspects 29-54.

Aspect 63: A non-transitory computer-readable medium storing code for wireless communication, the code comprising instructions executable by a processor to perform the method of one or more of Aspects 29-54.

Aspect 64: A non-transitory computer-readable medium storing a set of instructions for wireless communication, the set of instructions comprising one or more instructions that, when executed by one or more processors of a device, cause the device to perform the method of one or more of Aspects 29-54.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, or functions, among other examples, whether referred to as software, firmware, middleware, microcode, hardware description language, or otherwise. As used herein, a "processor" is implemented in hardware or a combination of hardware and software. It will be apparent that systems or methods described herein may be implemented in different forms of hardware or a combination of hardware and software. The actual specialized control hardware or software code used to implement these systems or methods is not limiting of the aspects. Thus, the operation and behavior of the systems or methods are described herein without reference to specific software code, since those skilled in the art will understand that software and hardware can be designed to implement the systems or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, or not equal to the threshold, among other examples.

Even though particular combinations of features are recited in the claims or disclosed in the specification, these combinations are not intended to limit the disclosure of various aspects. Many of these features may be combined in ways not specifically recited in the claims or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (for example, a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," and similar terms are intended to be open-ended terms that do not limit an element that they modify (for example, an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (for example, if used in combination with "either" or "only one of").

What is claimed is:

1. An encoder device for wireless communication, comprising:
   at least one processor; and
   at least one memory communicatively coupled with the at least one processor and storing processor-readable code that, when executed by the at least one processor, is configured to cause the encoder device to:

receive, from a network entity, in accordance with a buffer configuration of the encoder device or a buffer report associated with the encoder device, an indication of a set of transport blocks (TBs) for a network coded sidelink retransmission, the set of TBs associated with one or more sidelink transmissions;

receive, from the network entity, an indication of one or more uplink control channel resources that are to be used for providing feedback associated with the set of TBs, wherein the one or more uplink control channel resources include an uplink control channel resource associated with:

providing an indication of whether the set of TBs are stored in the buffer of the encoder device, or providing feedback indicating whether the network coded sidelink retransmission is successfully decoded by one or more receivers; and transmit the network coded sidelink retransmission based at least in part on encoding TBs, included in the set of TBs, that are stored in a buffer of the encoder device.

2. The encoder device of claim 1, wherein, to cause the encoder device to receive the indication of the set of TBs, the processor-readable code, when executed by the at least one processor, is configured to cause the encoder device to receive, for each TB included in the set of TBs, an indication of at least one of:

a source identifier, or a packet identifier.

3. The encoder device of claim 1, wherein an action to be performed based at least in part on one or more TBs, from the set of TBs, not being included in the buffer of the encoder device is configured by the base station or defined, wherein the action includes:

refrain from transmitting the network coded sidelink retransmission; or transmit the network coded sidelink retransmission without including the one or more TBs in the network coded sidelink retransmission.

4. The encoder device of claim 1, wherein the at least one memory further stores processor-readable code configured to cause the encoder device to receive, from the base station, an indication to remove one or more TBs, from the set of TBs, from the buffer of the encoder device based at least in part on the base station receiving acknowledgement (ACK) messages associated with the one or more TBs.

5. The encoder device of claim 1, wherein the at least one memory further stores processor-readable code configured to cause the encoder device to:

receive acknowledgement (ACK) messages associated with one or more TBs from the set of TBs; and transmit, to the base station, an indication to remove the one or more TBs from a buffer of the base station, wherein the indication includes, for a TB of the one or more TBs, at least one of:

a source identifier of the TB, a packet identifier of the TB, or one or more identifiers of receivers associated with the ACK messages.

6. The encoder device of claim 1, wherein the at least one memory further stores processor-readable code configured to cause the encoder device to receive, from the base station, the buffer configuration.

7. The encoder device of claim 1, wherein TBs that are to be buffered by the encoder device are based at least in part on one or more parameters indicated by the buffer configuration.

8. The encoder device of claim 7, wherein the one or more parameters include at least one of:

a time window associated with an initial transmission time of the TBs that are to be buffered by the encoder device, a remaining packet delay budget (PDB) of the TBs that are to be buffered by the encoder device, one or more source identifiers of the TBs that are to be buffered by the encoder device, one or more destination identifiers of the TBs that are to be buffered by the encoder device, a threshold quantity of retransmissions to be associated with the TBs that are to be buffered by the encoder device, a priority threshold for a priority of the TBs that are to be buffered by the encoder device, or location information of the TBs that are to be buffered by the encoder device.

9. The encoder device of claim 1, wherein the at least one memory further stores processor-readable code configured to cause the encoder device to transmit, to the base station, the buffer report, wherein the buffer report includes an indication of TBs that are included in the buffer of the encoder device.

10. The encoder device of claim 1, wherein the buffer report includes, for each TB included in the buffer of the encoder device, an indication of at least one of:

a source identifier associated with the TB, or an identifier associated with the TB.

11. A base station for wireless communication, comprising:

at least one processor; and at least one memory communicatively coupled with the at least one processor and storing processor-readable code that, when executed by the at least one processor, is configured to cause the base station to:

communicate, with an encoder device, a buffer configuration of the encoder device or a buffer report associated with the encoder device;

transmit, to the encoder device, an indication of a set of transport blocks (TBs), in accordance with the buffer configuration or the buffer report, associated with one or more sidelink transmissions, to be encoded by the encoder device; and transmit, to the encoder device, an indication of one or more uplink control channel resources that are to be used for providing feedback associated with the set of TBs, wherein the one or more uplink control channel resources include an uplink control channel resource associated with:

providing an indication of whether the set of TBs are stored in the buffer of the encoder device, or providing feedback indicating whether the network coded sidelink retransmission is successfully decoded by one or more receivers.

12. The base station of claim 11, wherein, to cause the base station to transmit the indication of the set of TBs, the processor-readable code, when executed by the at least one processor, is configured to cause the base station to transmit, for each TB included in the set of TBs, an indication of at least one of:

a source identifier, or a packet identifier.

13. A method of wireless communication performed by an encoder device, comprising:
- receiving, from a network entity, in accordance with a buffer configuration of the encoder device or a buffer report associated with the encoder device, an indication of a set of transport blocks (TBs) for a network coded sidelink retransmission, the set of TBs associated with one or more sidelink transmissions;
- receiving, from the network entity, an indication of one or more uplink control channel resources that are to be used for providing feedback associated with the set of TBs, wherein the one or more uplink control channel resources include an uplink control channel resource associated with:
  - providing an indication of whether the set of TBs are stored in the buffer of the encoder device, or
  - providing feedback indicating whether the network coded sidelink retransmission is successfully decoded by one or more receivers; and
- transmitting the network coded sidelink retransmission based at least in part on encoding TBs, included in the set of TBs, that are stored in a buffer of the encoder device.

14. The method of claim 13, wherein receiving the indication of the set of TBs comprises receiving, for each TB included in the set of TBs, an indication of at least one of:
- a source identifier, or
- a packet identifier.

15. The method of claim 13, wherein an action to be performed based at least in part on one or more TBs, from the set of TBs, not being included in the buffer of the encoder device is configured by the base station or defined, wherein the action includes:
- refraining from transmitting the network coded sidelink retransmission; or
- transmitting the network coded sidelink retransmission without including the one or more TBs in the network coded sidelink retransmission.

16. The method of claim 13, further comprising receiving, from the base station, an indication to remove one or more TBs, from the set of TBs, from the buffer of the encoder device based at least in part on the base station receiving acknowledgement (ACK) messages associated with the one or more TBs.

17. The method of claim 13, further comprising:
- receiving acknowledgement (ACK) messages associated with one or more TBs from the set of TBs; and
- transmitting, to the base station, an indication to remove the one or more TBs from a buffer of the base station, wherein the indication includes, for a TB of the one or more TBs, at least one of:
  - a source identifier of the TB,
  - a packet identifier of the TB, or
  - one or more identifiers of receivers associated with the ACK messages.

18. The method of claim 13, further comprising receiving, from the base station, the buffer configuration.

19. The method of claim 13, wherein TBs that are to be buffered by the encoder device are based at least in part on one or more parameters indicated by the buffer configuration.

20. The method of claim 19, wherein the one or more parameters include at least one of:
- a time window associated with an initial transmission time of the TBs that are to be buffered by the encoder device,
- a remaining packet delay budget (PDB) of the TBs that are to be buffered by the encoder device,
- one or more source identifiers of the TBs that are to be buffered by the encoder device,
- one or more destination identifiers of the TBs that are to be buffered by the encoder device,
- a threshold quantity of retransmissions to be associated with the TBs that are to be buffered by the encoder device,
- a priority threshold for a priority of the TBs that are to be buffered by the encoder device, or
- location information of the TBs that are to be buffered by the encoder device.

21. The method of claim 13, further comprising transmitting, to the base station, the buffer report, wherein the buffer report includes an indication of TBs that are included in the buffer of the encoder device.

22. The method of claim 13, wherein the buffer report includes, for each TB included in the buffer of the encoder device, an indication of at least one of:
- a source identifier associated with the TB, or
- an identifier associated with the TB.

23. A method of wireless communication performed by a base station, comprising:
- communicating, with an encoder device, a buffer configuration of the encoder device or a buffer report associated with the encoder device;
- transmitting, to the encoder device, an indication of a set of transport blocks (TBs), in accordance with the buffer configuration or the buffer report, associated with one or more sidelink transmissions, to be encoded by the encoder device; and
- transmitting, to the encoder device, an indication of one or more uplink control channel resources that are to be used for providing feedback associated with the set of TBs, wherein the one or more uplink control channel resources include an uplink control channel resource associated with:
  - providing an indication of whether the set of TBs are stored in the buffer of the encoder device, or
  - providing feedback indicating whether the network coded sidelink retransmission is successfully decoded by one or more receivers.

24. The method of claim 23, wherein transmitting the indication of the set of TBs comprises transmitting, for each TB included in the set of TBs, an indication of at least one of:
- a source identifier, or
- a packet identifier.

* * * * *